US012433688B2

(12) United States Patent
Liao et al.

(10) Patent No.: US 12,433,688 B2
(45) Date of Patent: Oct. 7, 2025

(54) METHOD AND SYSTEM FOR VASCULAR CATHETER TIP DETECTION IN MEDICAL IMAGES

(71) Applicant: SIEMENS HEALTHINEERS AG, Forchheim (DE)

(72) Inventors: Rui Liao, Princeton Junction, NJ (US); Venkatesh Narasimha Murthy, Hillsborough, NJ (US); Yue Zhang, Jersey City, NJ (US); Abdoul Aziz Amadou, London (GB)

(73) Assignee: Siemens Healthineers AG, Forchheim (DE)

(*) Notice: Subject to any disclaimer, the term of this patent is extended or adjusted under 35 U.S.C. 154(b) by 43 days.

(21) Appl. No.: 18/446,516

(22) Filed: Aug. 9, 2023

(65) Prior Publication Data
US 2024/0099784 A1 Mar. 28, 2024

(30) Foreign Application Priority Data

Sep. 23, 2022 (EP) .................... 22197534

(51) Int. Cl.
A61B 34/20 (2016.01)
A61B 6/00 (2006.01)
(Continued)

(52) U.S. Cl.
CPC ............. *A61B 34/20* (2016.02); *A61B 6/12* (2013.01); *A61B 6/481* (2013.01); *G06T 7/248* (2017.01); *G06T 7/277* (2017.01); *G06T 7/73* (2017.01); *G16H 30/40* (2018.01); *A61B 2034/2065* (2016.02); *A61M 2025/0166* (2013.01);
(Continued)

(58) Field of Classification Search
None
See application file for complete search history.

(56) References Cited

U.S. PATENT DOCUMENTS 11,058,385 B2 7/2021 Kunio
2010/0177942 A1* 7/2010 Kolatt ................... G06T 7/0012
382/128

(Continued)

FOREIGN PATENT DOCUMENTS

KR 102305965 B1 9/2021

OTHER PUBLICATIONS

Ambrosini, Pierre, et al. "Fully automatic and real-time catheter segmentation in X-ray fluoroscopy." Medical Image Computing and Computer-Assisted Intervention—MICCAI 2017: 20th International Conference, Quebec City, QC, Canada, Sep. 11-13, 2017, Proceedings, Part II 20. Springer International Publishing, 2017.
(Continued)

*Primary Examiner* — Patricia J Park

(57) ABSTRACT

A tip of a vascular catheter is detected in a sequence of vessel image frames obtained using x-rays. Within the vessel image frames, a proximal point corresponding to a vessel ostium is determined. The sequence of vessel image frames are cropped to an image area surrounding the proximal point to generate a cropped sequence of cropped vessel image frames. Within cropped vessel image frames not indicative of a contrast medium, the tip of the vascular catheter is detected, and the detected tip of the vascular catheter is tracked.

16 Claims, 11 Drawing Sheets

(51) Int. Cl.
  *A61B 6/12*   (2006.01)
  *G06T 7/246*  (2017.01)
  *G06T 7/277*  (2017.01)
  *G06T 7/73*   (2017.01)
  *G16H 30/40*  (2018.01)
  *A61M 25/01*  (2006.01)

(52) U.S. Cl.
  CPC .............. *G06T 2207/10016* (2013.01); *G06T 2207/10116* (2013.01); *G06T 2207/20132* (2013.01); *G06T 2207/30021* (2013.01); *G06T 2207/30101* (2013.01)

(56) References Cited

U.S. PATENT DOCUMENTS

| | | | | |
|---|---|---|---|---|
| 2016/0081760 | A1* | 3/2016 | Verard | A61B 34/20 600/424 |
| 2018/0042566 | A1* | 2/2018 | Roffé | A61B 6/4441 |
| 2018/0353240 | A1* | 12/2018 | Florent | A61B 34/10 |
| 2020/0222018 | A1* | 7/2020 | van Walsum | A61B 6/5264 |
| 2021/0346100 | A1 | 11/2021 | Auvray et al. | |
| 2022/0378514 | A1 | 12/2022 | Kweon et al. | |
| 2023/0143522 | A1* | 5/2023 | Keast | A61B 34/20 606/130 |
| 2024/0115230 | A1* | 4/2024 | De Bruijn | A61B 8/12 |

OTHER PUBLICATIONS

Ma, Hua, et al. "Dynamic coronary roadmapping via catheter tip tracking in X-ray fluoroscopy with deep learning based Bayesian filtering." Medical image analysis 61 (2020): 101634.

Piayda, Kerstin, et al. "Dynamic coronary roadmapping during percutaneous coronary intervention: a feasibility study." European journal of medical research 23 (2018): 1-7.

Ullah, Ihsan, et al. "Synthesize and segment: Towards improved catheter segmentation via adversarial augmentation." Applied Sciences 11.4 (2021): 1638.

Zhang, Liheng, et al. "Cascade attention machine for occluded landmark detection in 2D X-Ray angiography." 2019 IEEE winter conference on applications of computer vision (WACV). IEEE, 2019.

Extended European Search Report (EESR) mailed Feb. 27, 2023 in corresponding European Patent Application No. 22197534.5.

* cited by examiner

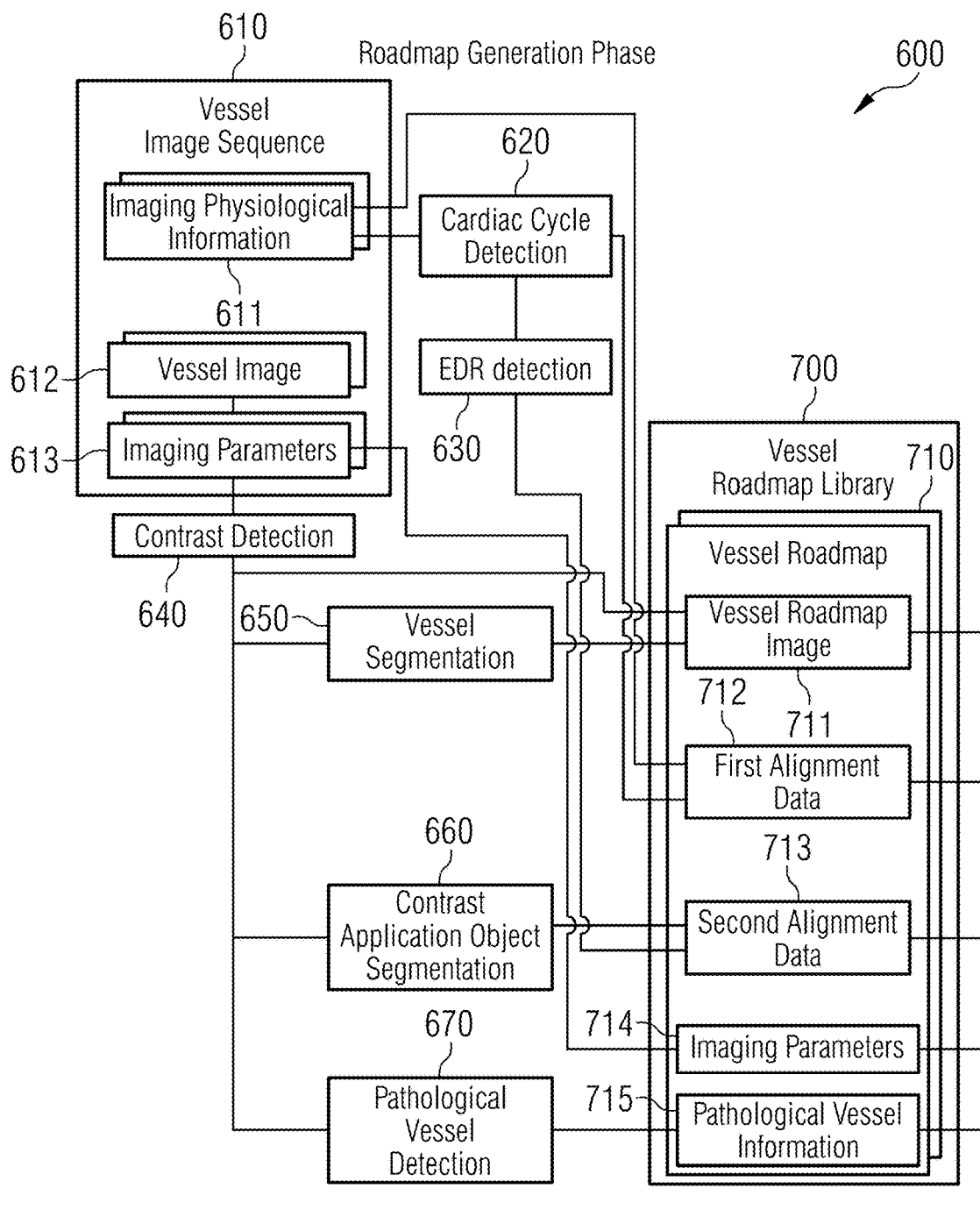

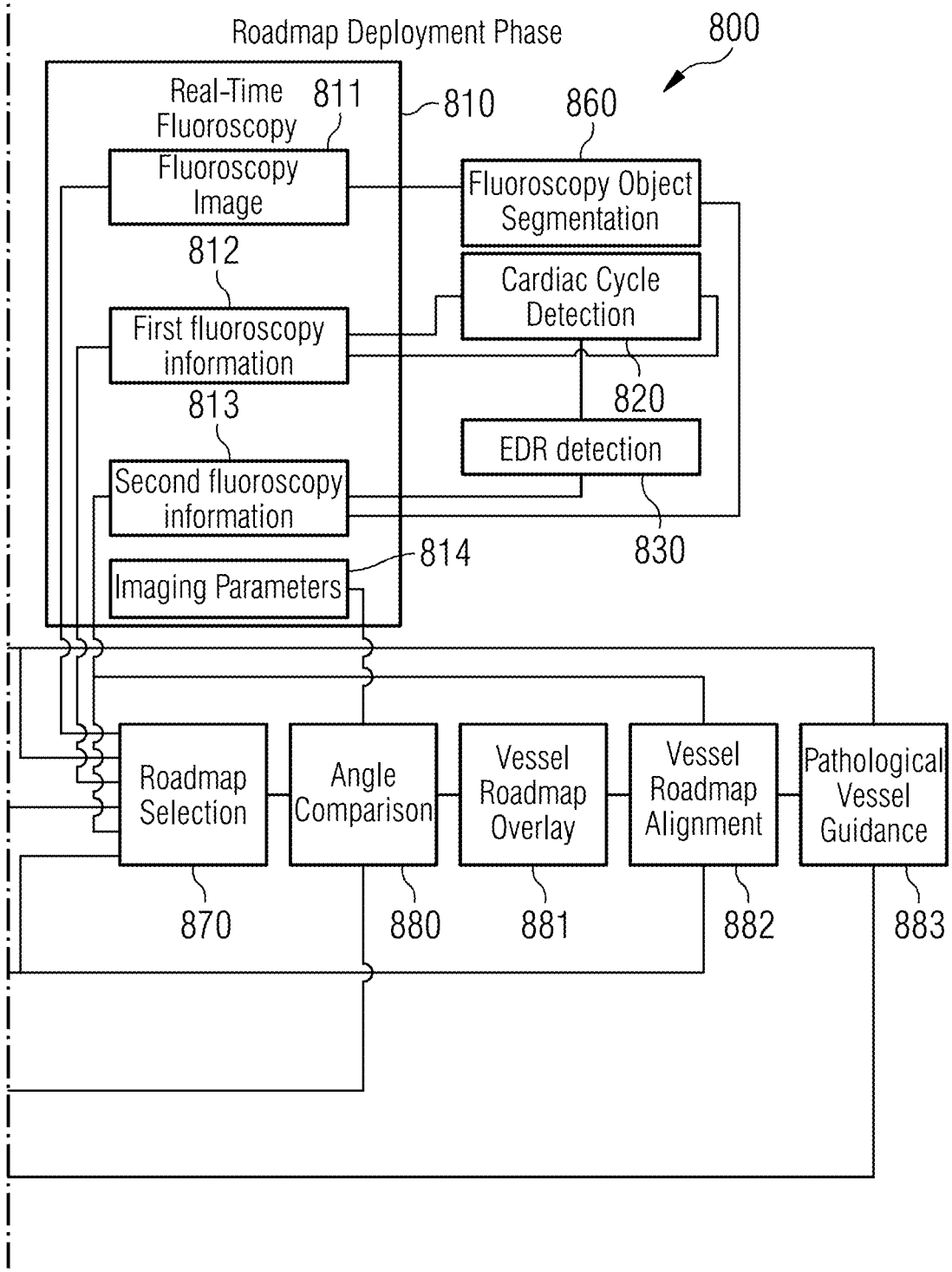

FIG 10
870
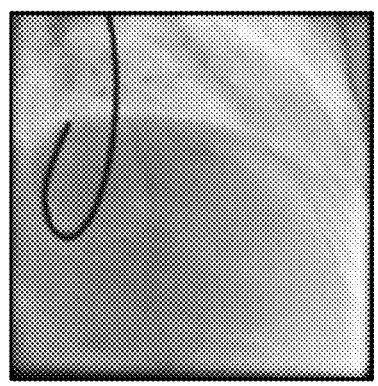 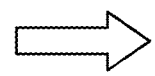 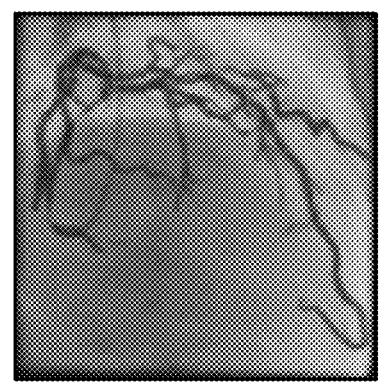
FIG 11
882
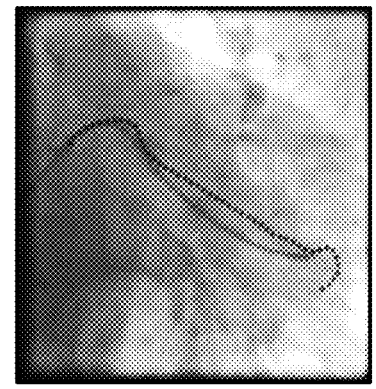 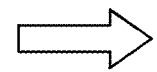 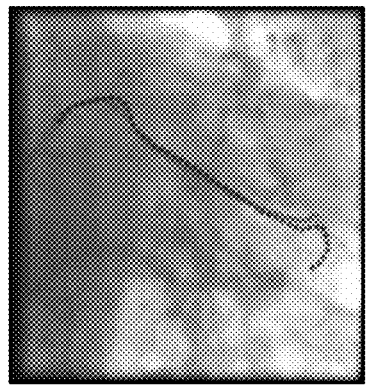

METHOD AND SYSTEM FOR VASCULAR CATHETER TIP DETECTION IN MEDICAL IMAGES

RELATED APPLICATION

This application claims the benefit of EP 22197534.5, filed Sep. 23, 2022, which is hereby incorporated by reference in its entirety.

TECHNICAL FIELD

The present disclosure generally relates to object detection in medical images and more precisely to detecting tips of vascular catheters in angiography and fluoroscopy images.

BACKGROUND

Interpretation and processing of image sequences obtained during angiography and fluoroscopy typically relies on the detection of anatomical and non-anatomical landmarks. One type of non-anatomical landmark relied upon for interpretation and processing of these image sequences is a vascular catheter and more precisely the tip thereof. However, the detection of the tip of a vascular catheter is rendered difficult by various factors, including, but not limited to, occlusion by the contrast medium ejected from the vascular catheter, low-signal-to-noise (SNR) in the image sequence, interference from radio-opaque anatomical landmarks, and interference from non-anatomical landmarks within the image sequence, such as parts of the medical imaging device used to obtain the image sequence or other radio-opaque non-anatomical landmarks, such as other catheters, stents or pacemakers.

Therefore, it is an objective to provide a detection of the tip of vascular catheters which overcomes the above-mentioned challenges.

SUMMARY

To achieve this objective, the present disclosure provides a computer-implemented method for detecting a tip of a vascular catheter in a sequence of vessel image frames obtained using x-rays. The method includes determining, within the vessel image frames, a proximal point, the proximal point corresponding to a vessel ostium, cropping the sequence of vessel image frames to an image area surrounding the proximal point to generate a cropped sequence of cropped vessel image frames, detecting, within cropped vessel image frames not indicative of a contrast medium, the tip of the vascular catheter, and tracking, within the sequence of vessel image frames, the detected tip of the vascular catheter.

To further achieve this objective, the present disclosure provides a non-transitory computer-readable medium including instructions configured to be executed by a computer including at least one processor, the instructions causing the processor to perform the above method.

To further achieve this objective, the present disclosure provides a medical imaging device including an x-ray imager configured to record a sequence of vessel image frames and at least one processor, the processor being configured to perform the above method.

BRIEF DESCRIPTION OF THE DRAWINGS

Embodiments of the present disclosure will be described with reference to the following appended drawings, in which like reference signs refer to like elements.

FIGS. 6, 6A and 6B show a schematic diagram of a pathological vessel guidance workflow according to embodiments.

FIG. 10 shows examples of laying a vessel roadmap over a real-time fluoroscopy according to embodiments.

FIG. 11 shows an example of overlaying a vessel roadmap and a real-time fluoroscopy image according to embodiments.

It should be understood that the above-identified drawings are in no way meant to limit the disclosure of the present invention. Rather, these drawings are provided to assist in understanding the invention. The person skilled in the art will readily understand that aspects of the present invention shown in one drawing may be combined with aspects in another drawing or may be omitted without departing from the scope of the present invention.

DETAILED DESCRIPTION

The present embodiments generally provide a method for detecting a tip of a vascular catheter in a sequence of vessel image frames. The method first determines a proximal point in the vessel image frames as an approximation of the tip of a vascular catheter. The method then crops the vessel image frames to an image area surrounding the proximal point to generate a cropped sequence of cropped vessel image frames. Since the proximal point is an approximation of the tip of the vascular catheter, the cropped vessel image frames include the tip of the vascular catheter. Accordingly, the method proceeds to detect the tip of the vascular catheter in a smaller image area compared to the full vessel image frames. Further, the method detects the tip of the vascular catheter in cropped vessel images not indicative of contrast medium, which renders detection of the tip of the vascular catheter easier compared to vessel image frames or cropped vessel image frames indicative of contrast medium. Finally, based on the detected position of the tip of the vascular catheter, the method tracks the tip of the vascular catheter across the vessel image frames of the sequence. This allows the method to determine any changes in the position of the tip of the vascular catheter caused by motion of the vessels into which the vascular catheter is inserted, such as breathing motion or cardiac motion.

Figure 1:
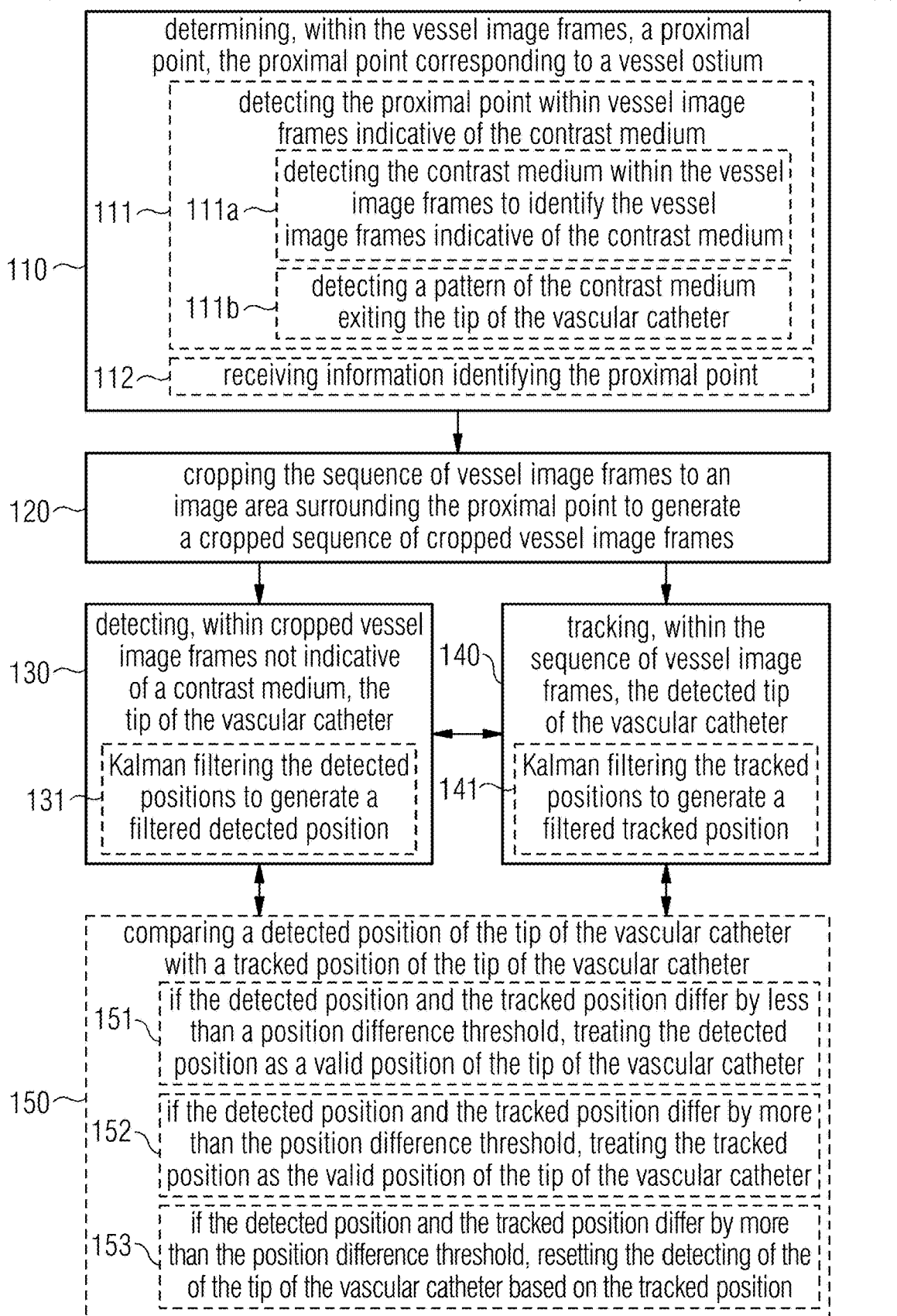
FIG. 1 provides a flowchart of a method for detecting a tip of a vascular catheter in a sequence of vessel image frames according to embodiments.
Figure 12A:
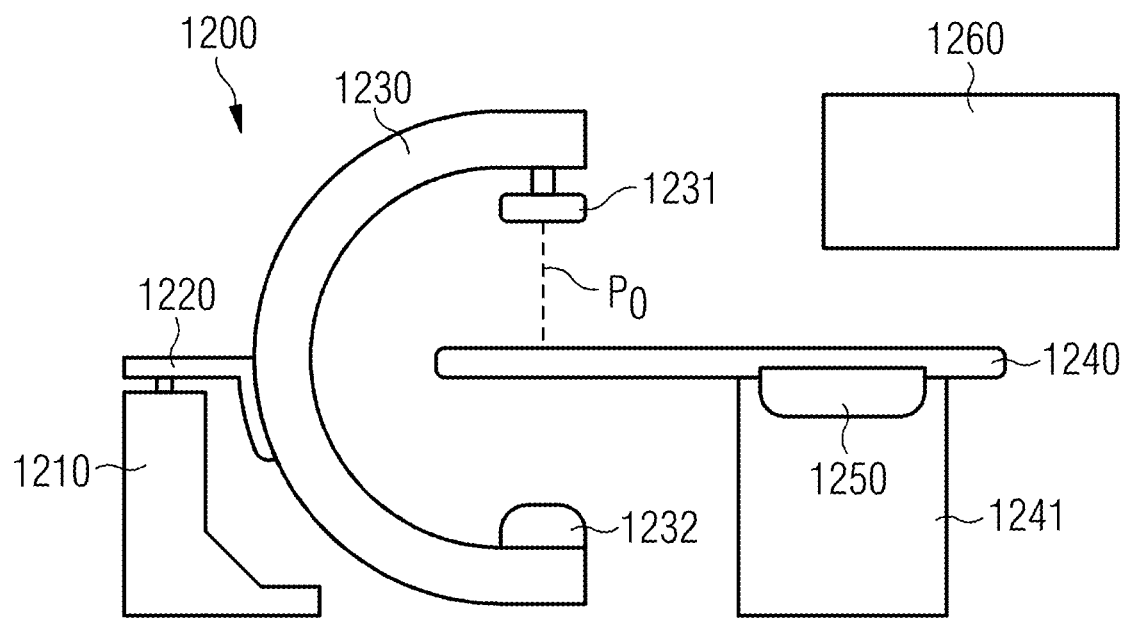
FIGS. 12A and 12B show an exemplary medical imaging system according to embodiments.

This general concept will now be explained with reference to the appended drawings. FIG. 1 details the method for detecting a tip of a vascular catheter in a sequence of vessel image frames, while FIGS. 2 to 5 illustrate various aspects of the method. FIGS. 6 to 11 illustrate a use case of the method for detecting a tip of a vascular catheter in a sequence of vessel image frames. Finally, FIGS. 12A to 13 illustrate devices, which may perform the method for detecting a tip of a vascular catheter in a sequence of vessel image frames.

FIG. 1 illustrates a flowchart of a method 100 for detecting a tip of a vascular catheter in a sequence of vessel image frames. Optional acts of method 100 are shown as dashed boxes in FIG. 1 Sub-acts of the various acts of method 100 are shown inside the boxes of the respective main acts.

Method 100 detects a tip of a vascular catheter in a sequence of vessel image frames.

In the context of the present disclosure, a vascular catheter refers to any tubular radio-opaque medical device configured to be inserted into vessels of a patient to e.g., enable visualization of vessels in medical imaging devices or to treat pathological conditions in vessels, such as stenosis. Accordingly, a tip of the vascular catheter refers to the end of the vascular catheter first inserted into a vessel of a patient. An exemplary vascular catheter and the tip thereof are illustrated in in FIGS. 2 to 4 and referred to by reference signs 210 and 210T, respectively. It should be noted that vessels in the context of the present disclosure refers to any kind of vessel of a patient, i.e., blood vessels and lymphatic vessels.

A sequence of vessel image frames in the context of the present disclosure refers to a sequence of medical images obtained using x-rays, e.g., obtained using angiography or fluoroscopy. The medical images may show vessels of interest based on a radio-opaque contrast medium or may show the vicinity of the vessels, i.e., the vessel and its surrounding area, without in fact showing the vessels, i.e., without a radio-opaque contrast medium. This is for example illustrated in FIGS. 2 and 4 where respective vessel image frames 201 of a sequence 200 show the same area of a patient. As can be seen, the vessel image frame 201 of FIG. 2 indeed shows a section of the coronary artery 230, while the vessel image frame 201 of FIG. 4 only shows the vicinity of the section of the coronary artery 230, as no contrast medium is applied in FIG. 4. The medical images are arranged temporally, i.e., starting at frame 0 corresponding to a start time of second 0 and may continue for the duration of the medical imaging process. In the context of angiography, the duration may be in the ranges of seconds, e.g., 15 seconds or less, i.e., e.g., 150 frames to 600 frames, depending on the acquisition speed. In the context of fluoroscopy, the duration may be in the ranges of minutes, e.g., 20 minutes or less, i.e., 12,000 frames to 48,000 frames, depending on the acquisition speed.

Figure 3:
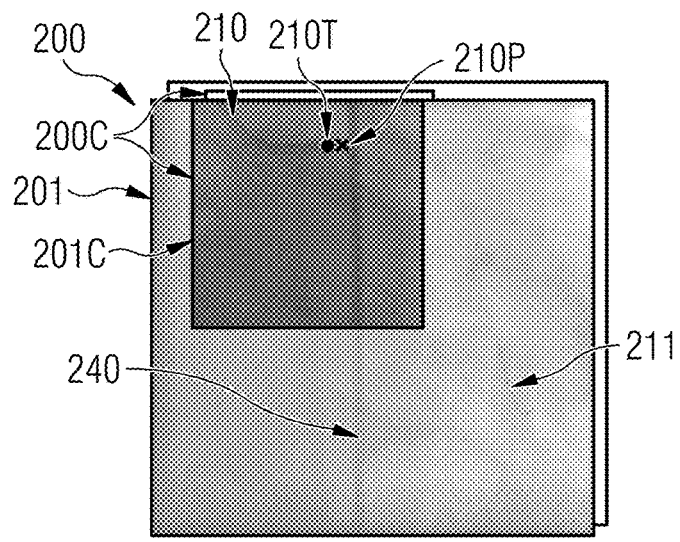
FIG. 3 provides an example of detecting a tip of a vascular catheter in a cropped vessel image frame according to embodiments.
Figure 4:
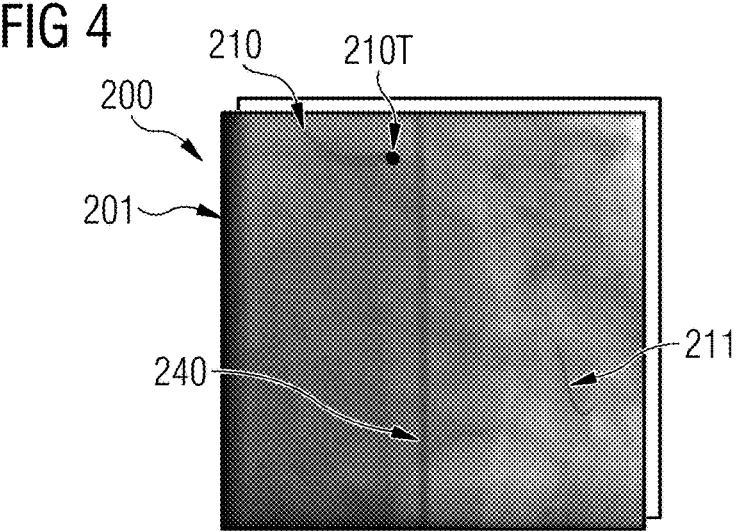
FIG. 4 provides an example of tracking the detected tip of the vascular catheter within the sequence of vessel image frames according to embodiments.

Method 100 starts at act 110, in which method 100 determines a proximal point within the vessel image frames 201. The proximal point serves as an initial approximation of the tip of the vascular catheter. Catheterization of vessels typically starts at the ostium, i.e., the beginning, of the vessel of interest. For example, if the vessel of interest is the internal iliac artery, during catheterization the catheter is initially advanced until the bifurcation of the internal iliac artery and the external iliac artery at the end of the common iliac artery. In a further example, if the vessel of interest is the left or the right coronary artery, the catheter is initially advanced during catheterization until the point where the right and the left coronary artery respectively branch off of the ascending aorta. Accordingly, the proximal point corresponds to a vessel ostium. An example of a proximal point 210P is shown in FIGS. 2 to 4.

Figure 2:
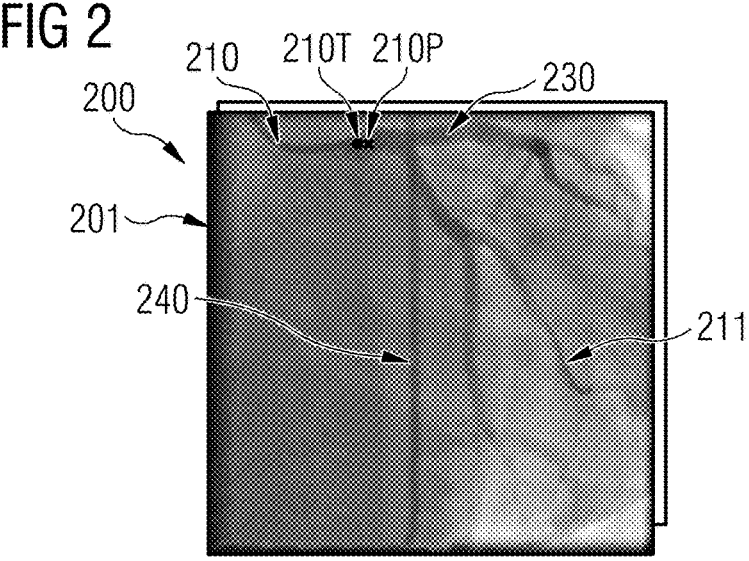
FIG. 2 provides an example of determining a proximal point in a vessel image frame according to embodiments.

As can be seen in FIG. 2, vascular catheter 210 is to the left of proximal point 210P and coronary artery 230 is to the right of proximal point 210P. In other words, FIG. 2 illustrates that the proximal point corresponds to the ostium of the coronary artery 2030 but also serves as an approximation of the position of the tip 210T of the vascular catheter 210.

Initially determining the proximal point 210P instead of immediately attempting to detect the tip 210T of the vascular catheter 210 helps to improve the detection of the tip 210T of the vascular catheter 210. The proximal point 210P represents a more dominant feature in the sequence 200 of vessel image frames 201 compared to the small and, depending on the resolution of the vessel image frames, faint structure of the tip 210T of the vascular catheter 210.

In particular, in examples of the present disclosure in which the vascular catheter 210 is used to inject contrast medium into the vessel of interest, the proximal point 210P may represent a very dominant feature within vessel image frames 201 indicative of contrast medium. Accordingly, act 110 may include a act 111, in which method 100 detects the proximal point 210P within vessel image frames 201 indicative of (representing or showing) the contrast medium.

To detect the proximal point 210P, method 100 may detect centroids of clusters within the vessel image frames 201 indicative of contrast medium. One of these detected centroids may correspond to the proximal point 210P. To detect the centroid corresponding to proximal point 210P, method 100 may, e.g., based on the values of pixels in the sequence of vessel image frames, detect clusters of pixels having pixel values indicative of radio-opaque areas within the sequence of vessel image frames and determine the centroids thereof, e.g., based on K-means clustering or other image processing algorithms capable of identifying such centroids.

Since act 111 relies on the presence of contrast medium in the sequence 200 of vessel image frames 201, act 111 may include an act 111a, in which method 100 may detect the contrast medium within the vessel image frames 201 to identify the vessel image frames indicative of the contrast medium. An example of a vessel image frame indicative of the contrast medium is shown in FIG. 2, in which coronary artery 230 is visible due to the presence of contrast medium. To detect the contrast medium, method 100 may in some examples of the present disclosure analyze the pixels of each vessel image frame 201 to detect, based on a property of the pixels, the presence of contrast medium in the respective vessel image frames. The property of the pixels may be, e.g., a brightness value or a color value. In some examples of the present disclosure, a vessel image frame 201 may be identified as a vessel image frame indicative of contrast medium if a single pixel indicative of contrast medium is identified. In some examples of the present disclosure, a vessel image frame 201 may be identified as a vessel image frame indicative of contrast medium if a number of pixels indicative of contrast medium which exceeds a contrast medium detection threshold is identified. In some examples of the present disclosure, method 100 may detect the contrast medium within the vessel image frames using a deep learning model, such as DeepNet, which identifies contrast medium in the sequence 200 of vessel image frames 201 and provides a frame-by-frame classification of the sequence 200 of the vessel image frame 201.

To detect the proximal point 210P, e.g., based on centroids of clusters as discussed above, act 111 may further include an act 111b, in which method 100 may detect a pattern of the contrast medium exiting the tip 210T of the vascular catheter 210. Since the contrast medium reaches its highest concentration in the proximity of the tip 210T of the vascular catheter 210 during the injection of the contrast medium, the contrast medium may form a pattern within vessel image frames 201. These patterns may be easy to detect by method 100. Method 100 may then determine the proximal point 210P as the center or centroid of the pattern formed by the contrast medium.

In addition to or instead of acts 111, 111a and 111b, method 100 may further include an act 112, in which method 100 may receive information identifying the proximal point 210P. The information may for example identify the position of the proximal point 210P in terms of a pixel coordinate system of the vessel image frames 201. The information identifying the proximal point 210P may have been determined during a previous medical imaging process performed on the patient. For example, the information identifying the proximal point 210P may have been determined during an angiography used to determine the need for a fluoroscopy-based medical intervention. The information identifying the proximal point 210P may then be used during the subsequent fluoroscopy-based medical intervention. A further example of determining the proximal point 210P first by detecting the proximal point 210P during one medical imaging process and then providing information on the proximal point to a subsequent medical imaging process is shown in FIGS. 6A and 6B, which will be discussed subsequently in more detail. In FIGS. 6A and 6B, a vessel image sequence 610 may be recorded during a roadmap generation phase 600, during which method 100 may detect the proximal point 210P. During a subsequent roadmap deployment phase 800, a fluoroscopy image 811 may be recorded, in which method 100 may determine the proximal point 210P based on the information identifying the proximal point 210P generated during the roadmap generation phase 600. The approach of determining the proximal point 210P once based on detecting the proximal point 210P and once based on receiving information identifying the proximal point 210 may enable the subsequent medical imaging process to be performed without contrast medium. In further examples of the present disclosure, method 100 may perform both acts 111 and 112, wherein receiving the information identifying the proximal point 210P may serve as a verification whether the detected proximal point is plausible.

In act 120, method 100 crops the sequence 200 of vessel image frames 201 to an image area surrounding the proximal point to generate a cropped sequence 200C of cropped vessel image frames 201C. In other words, method 100 reduces the image area of the vessel image frames 201 to an image area surrounding the proximal point 210P. For example, the image area of the cropped vessel image frames may take the shape of a rectangle defined by left, right, down and up distances from the proximal point 210P, as e.g., shown in FIG. 3. These distances may be defined in pixels. As can be seen in FIG. 3, the proximal point is not at the center of cropped vessel image frame 201C, i.e., the left, right, down and up distances differ from one another. In some examples, the image area may be defined as a circle with a radius defined in pixels around the proximal point 210P. It should be noted that both the left, right, down and up distances as well the radius may also be defined in mm instead of pixels. More generally, method 100 crops the vessel image frames to a reduced image area which can serve as a basis for the detection of the tip 210T of the vascular catheter 210 in the act 130 of method 100. The reduced image area renders the subsequent detection of the tip 210T of the vascular catheter 210 easier and more accurate as the image includes less radio-opaque structures which may lead to a false detection of the tip 210T of the vascular catheter 210. It will be understood that the image area may take any shape which fulfills the purpose of reducing the image area of the vessel image frames 201 in order to enable the detection of the tip 210T of the vascular catheter 210 and that the proximal point 201P need not be at the center of the image area.

The cropped sequence 200C may be a copy of the sequence 200, i.e., the cropped sequence 200C may, based on the proximal point 210P, include the reduced image areas of all vessel image frames 201 of sequence 200. The cropped sequence 200C may be an indication of the image area surrounding the proximal point 210P, i.e., the cropped sequence may be an indication of the radius or of the left, right, down and up distances discussed above. More generally speaking, the cropped sequence may be an indication of the image area surrounding the proximal point, which may or may not include an actual image data subset of sequence 200.

In act 130, method 100 detects the tip 210T of the vascular catheter 210 within cropped vessel image frames 201C not indicative of a contrast medium. By detecting the tip 210T of the vascular catheter 210 in cropped vessel image frames 201C not indicative of a contrast medium, the detection of the tip 210T is rendered easier because occlusion from the radio-opaque contrast medium is reduced. In other words, the number of pixels indicative of radio-opaque objects and thus the number of candidate areas within the cropped vessel image frames 201C is reduced, thereby rendering the detection of the tip 210T easier.

Act 130 may e.g., detect the tip 210T of the vascular catheter 210 based on a variety of image segmentation approaches, such as based on convolutional neural networks (CNN), e.g., U-Net, densely connected neural networks, deep-learning methods, graph-partitioning methods, e.g., Markoff random fields (MRF), or region-growing methods, e.g., split-and-merge segmentation. Using any of these exemplary image segmentation processes, method 100 may detect the tip 210T of the vascular catheter 210 based on classifying within each cropped vessel image frame 201C not indicative of the contrast medium a position within each cropped vessel image frame 201C as the tip 210T. In other words, method 100 may detect the tip 210T of the vascular catheter 210 frame-by-frame, i.e., in each cropped vessel image frame 201C individually. Since act 130 outputs a position classified as the tip 210T for each individual cropped vessel image frame 201C not indicative of a contrast medium as detected positions, act 130 may include an act 131, in which method 100 Kalman filters the detected positions to generate a filtered detected position. The filtering of the positions leads to a smoother and more robust output of the detection of the tip 210T. This may in particular be the case with regard to the detected positions within the initial vessel image frames of cropped sequence 200C. The detected positions within the initial vessel images frames may be subject to incorrect detections, which may be smoothed out by the filtering in act 131. It will be understood that method 100 may employ other filtering methods or other signal processing methods to achieve a smooth and robust output of the detected position of the tip 210T.

Since act 130 detects the tip 210T of the vascular catheter 210 within cropped vessel image frames 201C not indicative of a contrast medium, method 100 may, as part of act 130, detect the absence of contrast medium in the cropped vessel images. Method 100 may detect the absence of contrast medium in the same manner as method 100 detects the contrast medium in act 111a with the various values of the pixels and the thresholds inversed.

In act 140, method 100 tracks the tip 210T detected in act 130 within the sequence 200 of vessel image frames 201. In other words, based on the tip 210T detected in act 130 in cropped vessel images 201C, method 100 proceeds in act 140 to track the detected tip 210T throughout the vessel image frames 201 of sequence 200, i.e., within the full vessel image frames 201 regardless of the presence of contrast medium. Method 100 may track the detected tip 210T throughout the vessel image frames 201 based on a correlation between temporally adjacent vessel image frames 201. To this end, method 100 may, starting with the position of the detected tip 210T in a frame n, which may e.g., be frame 0, determine an image area in frame n+1, in which the next position of the tip 210T may be expected. Method 100 may then subdivide this image area into sub-areas, which may be combined using a cross correlation layer to generate a feature affinity map. Method 100 may then process the feature affinity map using a convolutional network to obtain an affinity score, which indicates the most likely motion of the tip 210T between frames n and n+1. Based on this most likely motion, method 100 may determine the position of the tip 210T in frame n+1. Method 100 may proceed to perform these acts for each frame, wherein the image area in which the next position of the tip 210T may be expected, may be determined in all subsequent frames based on the tracked position of tip 210T instead of the detected position of tip 210T used for the image area in frame n+1. It will be understood that tracking the tip 210T based on cross-correlation and affinity scores is merely provided as an example. Method 100 may track the tip 210T using other approaches to rack the tip 210T throughout the sequence 200 of vessel image frames 201.

Since act 140 outputs a tracked position of the tip 210T for each vessel image frame 201 of the sequence 200, act 140 may include an act 141, in which method 100 Kalman filters the tracked positions to generate a filtered tracked position. Act 141 may be similar to act 131, in which method 100 may filter the detected positions determined by act 130.

Acts 130 and 140 of method 100 may be performed subsequently, i.e., act 130 detects the tip 210T of the vascular catheter and act 140 then tracks the tip 210T throughout the sequence 200 of vessel image frames. However, act 130 and act 140 may also be performed concurrently, as illustrated in FIG. 1. Concurrently, in the context of the present disclosure, means that method 100 may perform acts 130 and 140 on substantially the same frame number of the sequence 200 and the cropped sequence 200C. Substantially refers to the fact that, as discussed above, the detected position in act 130 is used as the input of act 140. Accordingly, act 130 may be detecting the tip 210T in frame n while act 140 may be tracking the tip 210T in frame n+1. Further, method 100 may start to perform act 130 slightly before act 140 given that the output of the first performance of act 130 is needed as the input of the first performance of act 140. Likewise, act 140 may reach the end of sequence 200 slightly after act 130, i.e., act 140 may still be performed slightly after act 130. Concurrently is thus to be understood to mean that both acts are performed at the same time but not necessarily on the same frame and with different start and end times, if required.

In examples of the present disclosure, in which method 100 performs acts 130 and 140 concurrently, the position of the tip 210T detected by act 130 may be used to verify the plausibility of the position of the tip 210T tracked by act 140. Likewise, the position of the tip 210T tracked by act 140 may be used to verify the plausibility of the position of the tip 210T detected by act 130.

In some examples of the present disclosure, the tracked position of act 140 may be used by method 100 to verity the plausibility of the position of the tip 210T detected in act 130 and may be re-initialized for each frame n+1 based on the detected position of the tip 210T in frame n in act 130. Accordingly, the tracked position of act 140 may be used as a framewise re-initialized plausibility verification. The same framewise re-initialized plausibility verification may be used for act 140, where the output of act 140 may take the place of the proximal point after the first initialization of act 130 based on the proximal point 210P. The framewise re-initialized plausibility verification is illustrated in FIG. 1 by the arrows pointing from act 130 to act 140 and vice-versa.

Method 100 may choose which position to use as the valid position of the tip 210T based on the duration of the sequence 200 and based on the presence or absence of contrast medium in the vessel image frames 201. For example, the presence of contrast medium may render the detected position of tip 210T less reliable, in which cases the output of act 140 may be more reliable. In such situations, method 100 may chose to output the tracked position of tip 210T as the valid position. In some examples, tracking the tip 210T may be subject to drift over time. Accordingly, in such situations the output of act 130 may be more reliable and method 100 may choose to output the detected position of tip 210T as the valid position. Based on the above criteria, method 100 may also chose the appropriate framewise re-initialization plausibility verification in examples of the present disclosure implementing the framewise re-initialization plausibility verification. To provide an example, if vessel image frames 201 correspond to fluoroscopy images 811 of FIG. 6B, none of the vessel image frames 201 include contrast medium, as will be discussed later with regard to FIGS. 6A and 6B. In such an example, method 100 may choose to generally consider the detected position of act 130 as the valid position and use act 140 as framewise re-initialization plausibility verification. Only if the tracked position of act 140 appears more plausible than the detected position of act 130 will the tracked position of act 140 be considered as the valid position in this example.

Based on the above examples of how the concurrent performance of acts 130 and 140 may be used, method 100 may include an act 150, in which method 100 compares the position of the tip 210T detected by act 130 with the position of the tip 210T tracked by act 140. If the position of tip 210T detected by act 130 and the position of tip 210T tracked by act 140 differ by less than a position difference threshold, method 100 may, in an act 151, treat the position of the tip 210T detected by act 130 as the valid position of the tip 210. If the position of tip 210T detected by act 130 and the position of tip 210T tracked by act 140 differ by more than the position difference threshold, method 100 may, in an act 152, treat the position of the tip 210T tracked by act 140 as the valid position of the tip 210T.

Figure 5:
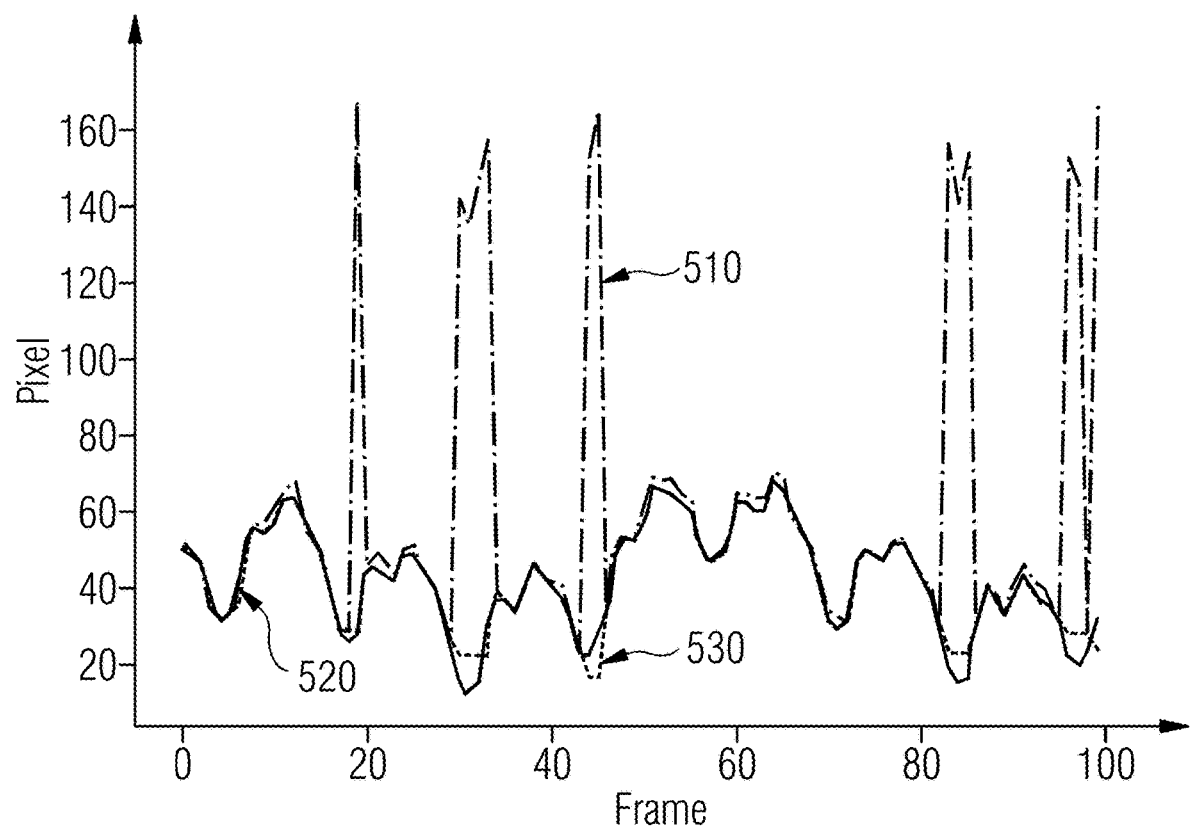
FIG. 5 provides an example diagram comparing a detected position, a tracked position and a filtered position of the tip of the vascular catheter according to embodiments.

An example of act 151 and act 152 is shown in FIG. 5. FIG. 5 shows a comparison of a position 510 of tip 210T detected by act 130, a position 530 of tip 210T tracked by act 140 and a filtered valid position 520 of the tip 210T output based on the chosen filtered position of either act 131 or act 141 as determined by act 151 and act 152. The positions are respectively shown from vessel image frame 0 to vessel image frame 100 of an exemplary sequence 200 in terms of a pixel number. As can be seen, the position 510 of tip 210T detected by act 130 changes greatly within some frame ranges, such as around frame 20 or frame 85. This may e.g., occur if act 130 mis-detects the tip 210T as radio-opaque structure 240 shown in FIGS. 2 to 4. This may happen when tip 210T gets close to or overlaps with radio-opaque structure 240. Radio-opaque structure 240 may e.g., be another catheter or may be part of the medical imaging device used to obtain sequence 200. In such cases, method 100 may determine for e.g., frames 18 to 20 or frames 82 to 85 to treat the position tracked by act 140 as the valid output instead of the position detected by act 130. Accordingly, the filtered valid position 520 of the tip 210T does not exhibit the rapid changes in position as position 510. It will be understood that also unfiltered position 510 and unfiltered position 530 may be treated as the valid position 520 by acts 151 and 152 of method 100 in examples of the present disclosure in which acts 131 and 141 are omitted.

The position difference threshold may serve to implement the plausibility verification discussed above. The position difference threshold may be an absolute pixel value indicating a difference between the pixel position of tip 210T detected by act 130 and the pixel position of tip 210T tracked by act 140. The position difference threshold may be an indication of change between subsequent vessel image frames 201 of the position of tip 210T detected by act 130 and of the position of tip 210T tracked by act 140, e.g., in terms of number of pixels or in terms percentage of change between frames.

It will be understood that the position difference threshold may be implemented based on other metrics in order to implement the plausibility verification discussed above. Further, it will be understood that the logic behind acts 151 and 152 may be inverted. In other words, in some examples of the present disclosure, method 100 may treat the position of the tip 210T tracked by act 140 as the valid position of the tip 210 if the position of tip 210T tracked by act 140 and the position of tip 210T detected by act 130 differ by less than the position difference threshold and may treat the position of the tip 210T detected by act 130 as the valid position of the tip 210T if the position of tip 210T tracked by act 140 and the position of tip 210T detected by act 130 differ by more than the position difference threshold. As discussed above, whether the position detected by act 130 or the position tracked by act 140 is treated as valid position may depend on at least one of the duration of the sequence 200, the presence of contrast medium in vessel image frames 201, an accuracy of the detection algorithm employed by act 130, and the accuracy of the tracking algorithm employed by act 140.

If the position of the tip 210T detected by act 130 and the position of the tip 210T tracked by act 140 differ by more than the position difference threshold, method 100 may further, in an act 153, reset the detection of the tip 210T performed by act 130 based on the position of the tip 210T tracked by act 140. To this end, method 100 may, as part of act 153, repeat act 120 with the position of tip 210T tracked by act 140 taking the place of the proximal point. This repetition of act 120 based on the position of tip 210T tracked by act 140 enables resetting act 130 based on the position of the tip 210T tracked by act 140.

In summary, act 150 and its sub-acts provide an example plausibility verification of the position determined by act 130 and of the position tracked by act 140. Act 150 may further include sub-acts instructing one of acts 130 and 140 to serve as the framewise re-initialized plausibility verification of one of acts 140 and 130.

Method 100 may be employed in a pathological vessel guidance workflow for the purpose of detecting the tip 201T of the vascular catheter 201 as part of the generation and the deployment of vessel roadmaps, which will now be discussed in the following.

FIGS. 6, 6A and 6B show a schematic diagram of a pathological vessel guidance workflow according to various embodiments. FIG. 6 shows the orientation of FIGS. 6A and 6B with regard to one another. The lines shown in FIGS. 6A and 6B indicate where various data, such as vessel image 612 or the output of processing entities, such as vessel segmentation 650, is provided. The blocks shown in FIG. 6 indicate both processing entities, such as cardiac cycle detection 620, and stored data elements, such as vessel roadmap 711.

The workflow is separated into two phases, i.e., a roadmap generation phase 600 and a roadmap deployment phase 800. Roadmap generation phase 600 is shown in FIG. 6A. Roadmap deployment phase 800 is shown in FIG. 6B. During roadmap generation phase 600, a vessel image sequence 610 is processed to generate a vessel roadmap library 700. Vessel roadmap library 700 is then deployed in roadmap deployment phase 800 to provide a dynamic vessel roadmap for guidance of a fluoroscopy object during fluoroscopy. First, roadmap generation phase 600 will be described.

Vessel image sequence 610 may include a plurality of vessel images 612, which corresponds to vessel image frames 201 discussed above. In some examples of the present disclosure, vessel images 612 may be stored as or may be Digital Imaging and Communications in Medicine (DICOM) images.

Vessel image sequence 610 may include imaging physiological information 611. Imaging physiological information 611 may be any physiological information of a patient recorded while the imaging method used to obtain vessel images 612 is performed and which may be used to later overlay and align vessel roadmaps with a real-time fluoroscopy image. In particular, imaging physiological information 611 may be recorded at approximately the same point in time as the corresponding vessel image 612. In some embodiments, imaging physiological information 611 may include or may be an electrocardiogram (ECG) recorded while the imaging method used to obtain vessel images 612 is performed. In some embodiments, imaging physiological information may be stored as or may be a DICOM data tag included in the DICOM image file of the corresponding vessel image 612. Imaging physiological information 611 may be included in, e.g., stored as part of, first alignment data 812 of a vessel roadmap 810.

Vessel image sequence 610 may include imaging information 613. Imaging information 613 may indicate one or more parameters associated with an imaging method used to obtain vessel images 612. As discussed above, the imaging method used to obtain vessel images 612 may for example be angiography. Accordingly, imaging information 613 may include at least one of an angiography angle and a contrast medium dosage.

Figure 12B:
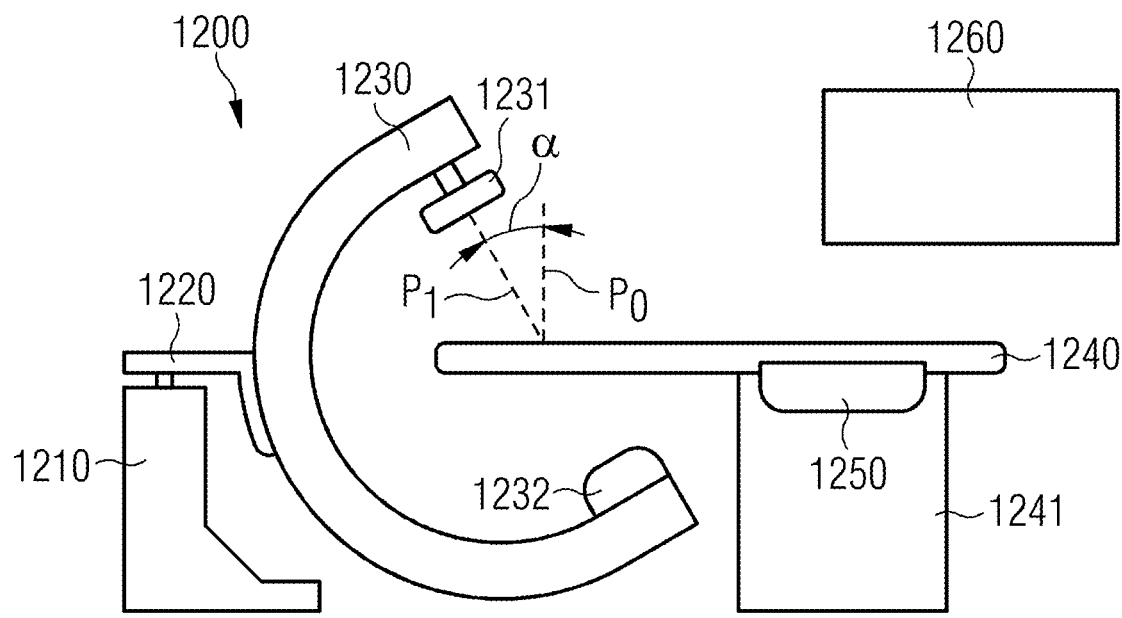
Figure 13:
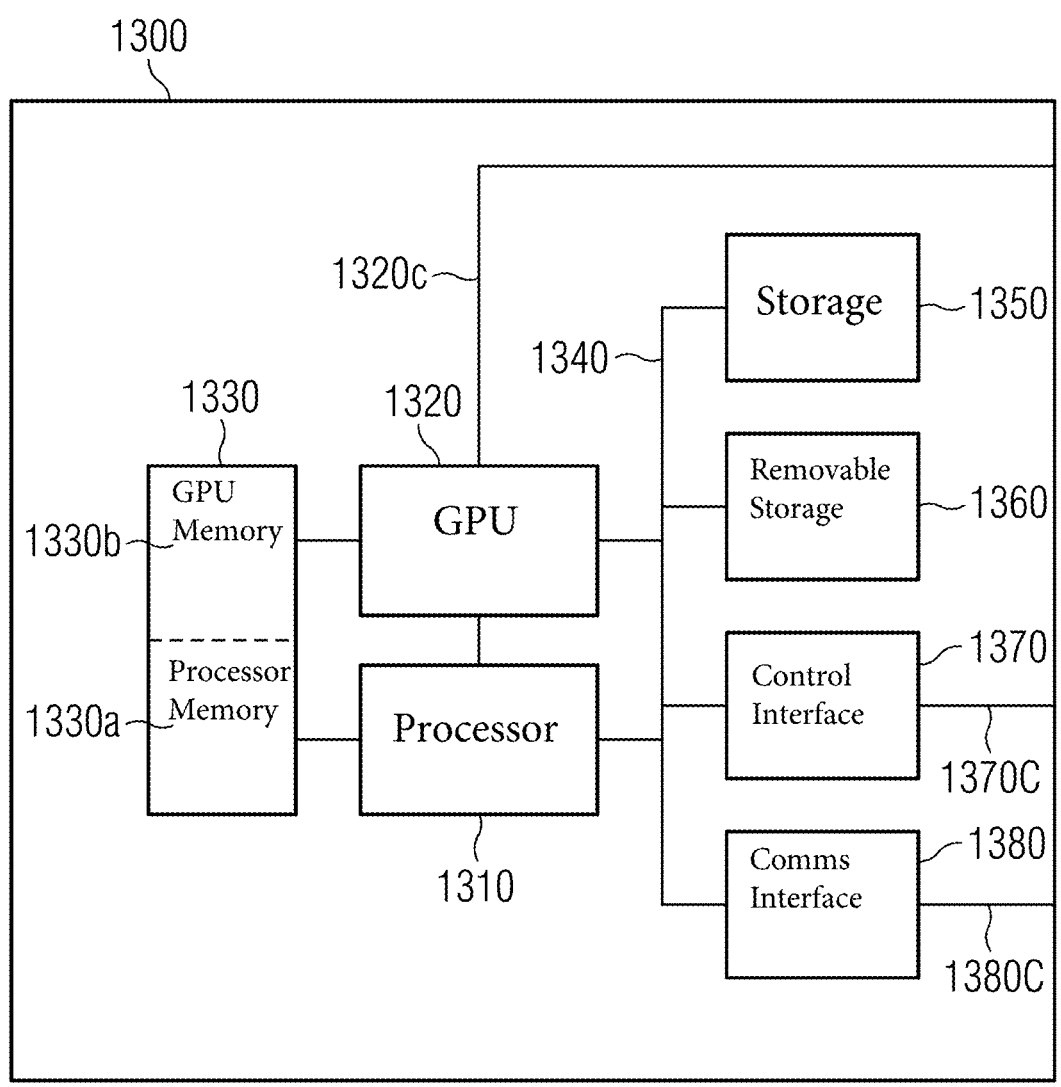
FIG. 13 shows an exemplary computing device according to embodiments.

Briefly referring to FIGS. 12A and 12B, both show a medical imaging system 1200 including a rotatable C-arm 1230. X-ray emitter 1231 and X-ray detector 1232 may be mounted on C-arm 1230. In FIG. 12A, C-arm 1230 is in a neutral position $P_0$, i.e., X-ray emitter 1231 are located directly above a patient surface 1240. In FIG. 12B, C-arm 1230 and thereby X-ray emitter 1231 are rotated counterclockwise with respect to neutral position $P_0$ of C-arm 1230 in FIG. 12A to a position $P_1$. The angle between position $P_0$ and position $P_1$, as indicated in FIG. 12B, is referred to as the angiography angle or the fluoroscopy angle, depending on the medical imaging process. It will be understood that the neutral position may be used as an imaging position. In such a case, the angiography angle is 0°. Further, in case of a single axis angiography system, the neutral position is typically defined as shown in FIG. 12A. In multiple axis angiography systems, additional C-arms may be present, such as a ceiling mounted C-arm. In such a case, the neutral position may be defined as the position in which X-ray emitter 1231 and X-ray detector 1232 are at the same level as a patient on a patient surface 1240.

While the above definition of the angiography angle is based on the position of X-ray emitter 1231, the angiography angle may analogously be defined based on the position of X-ray detector 1232.

The contrast medium dosage may indicate the dosage of radio-opaque contrast medium administered to a patient in order to render the vessels of the patient visible during the imaging method. The contrast medium dosage may be measured in milliliters per kilogram of body weight. In the case of contrast media including iodine, the contrast medium dosage may also be measured in milligram iodine per kilogram of body weight.

Vessel images 612 may be processed by contrast detection 640 to detect contrasted vessel images among the plurality of vessel images 612. Contrast detection 140 may detect contrasted vessel images by detecting the presence of contrast medium in vessel images 612. Contrast detection 640 may be performed as discussed above with regard to act 111a of FIG. 1. In some embodiments, contrast detection 640 may also take into account the contrast medium dosage indicated by imaging parameters 614.

The contrasted vessel images detected by contrast detection 640 are provided to vessel segmentation 650 and contrast application segmentation 660. Furthermore, each contrasted vessel image may be included in, e.g., stored as part of, a vessel roadmap image 611 of vessel roadmap 610.

Vessel segmentation 650 may perform vessel segmentation on the contrasted vessel images to generate vessel segmentation data. Accordingly, vessel segmentation 650 may generate data indicative of the position and/or the course of the vessels within the contrasted vessel images. Vessel segmentation data may be generated by vessel generation 650 based on a variety of image segmentation approaches, such as based on convolutional neural networks (CNN), e.g., U-Net, densely connected neural networks, deep-learning methods, graph-partitioning methods, e.g., Markoff random fields (MRF), or region-growing methods, e.g., split-and-merge segmentation. The vessel segmentation data may then be included in, e.g., stored as part of, a vessel roadmap image 711 of a vessel roadmap 710.

It should be noted that, while vessel segmentation 650 is shown in FIG. 1 as processing contrasted vessel images, vessel segmentation may also directly process vessel images 612 to generate vessel segmentation data prior to detecting contrasted vessel images. In some embodiments, vessel segmentation 650 may also be incorporated into or be part of contrast detection 640. In such embodiments, detecting pixels indicative of contrast mediums may at the same time be used to generate vessel segmentation data.

Contrast application object segmentation 660 may perform contrast application object segmentation on the contrasted vessel images to generate contrast application object segmentation data. Accordingly, contrast application object segmentation data may identify a position and/or the course of the contrast application object in the contrasted vessel images. More precisely, the contrast application object segmentation data may in some embodiments be a catheter, which is used to apply the contrast medium. In other words, contrast application object segmentation 660 may for example detect the tip 210T of catheter 210 and may thus implement method 100 of FIG. 1. The contrast application object segmentation data, i.e., e.g., the valid detected position of the tip 210T, may then be included in, e.g., stored as part of, second alignment data 713 of vessel roadmap 710.

While contrast application object segmentation 660 is shown in FIG. 6A as processing contrasted vessel images, contrast application object segmentation 660 may also directly process vessel images 612, e.g., based on act 111a of method 100.

Figure 7:
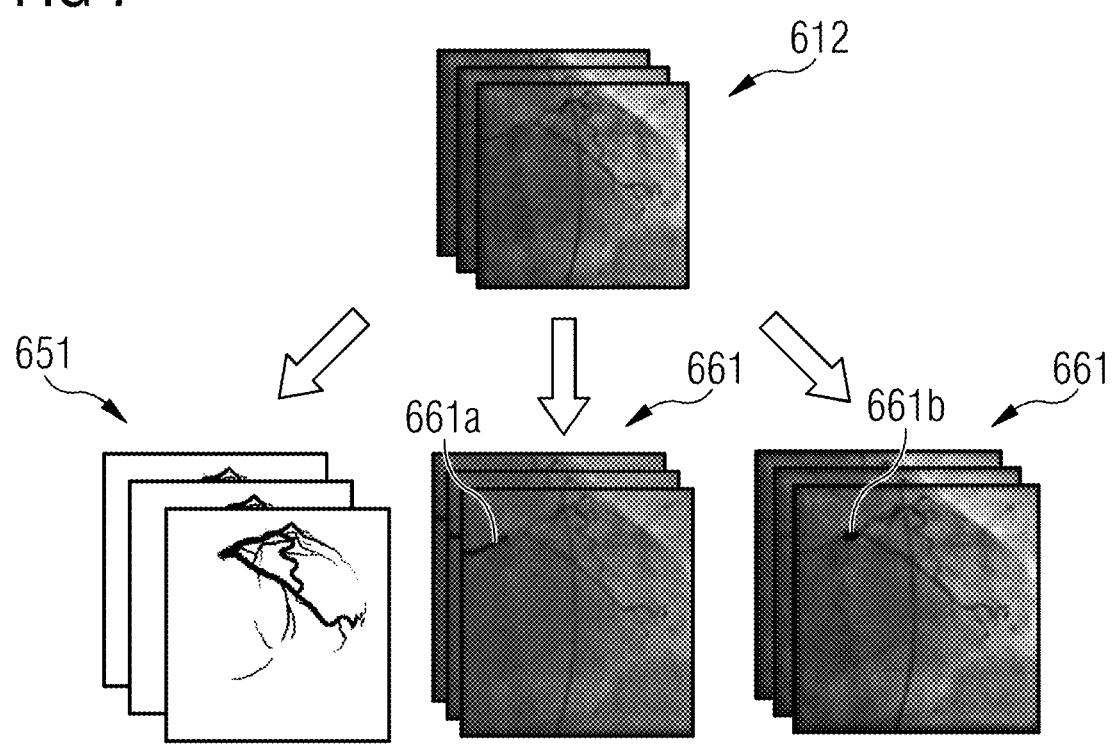
FIG. 7 shows examples of segmentations which may be obtained from a vessel image sequence according to embodiments.

Both vessel segmentation 650 and contrast application object segmentation 660 perform image segmentation on vessel images 612 or contrasted vessel images, respectively. To better illustrate possible segmentations performed on vessel images 612 or contrasted vessel images, respectively, FIG. 7 shows three example segmentations of a vessel image 712. From left to right, FIG. 7 shows an example of vessel segmentation data 651 and two examples of contrast application object segmentation data 661. As can be seen, vessel segmentation data 651 indicate the position and the course of the vessels in vessel image 612. The left vessel segmentation data 661 indicate the position and the course of a catheter body 661a. The right vessel segmentation data 661 indicate the position of a catheter tip 661b. The right vessel segmentation data 661 thus corresponds to the output of method 100 of FIG. 1.

Pathological vessel detection 670 detects pathological vessels in the contrasted vessel images. To this end, pathological vessel detection 670 performs image segmentation on the contrasted vessel images to identify areas within the contrasted vessel images, which include pathological vessel segments. In one example, pathological vessel detection 670 may detect one or more pathological vessels based on any one of the image segmentation approaches trained on vessel images with annotated pathological vessels. The pathological vessels detected by pathological vessel detection 670 may then be included as pathological vessel data 715 in vessel roadmap 710.

Pathological conditions in vessels often affect the lumina of the vessel. Accordingly, pathological vessel detection 670 may in a further example detect pathological vessels based on their lumina. Accordingly, pathological vessel detection 670 may first determine centerlines of the vessels included in the contrasted vessel images. Then, pathological vessel detection 670 may determine, based on the centerlines, lumina of the vessels included in each vessel roadmap image of the vessel roadmap library. Finally, pathological vessel detection 670 may detect one or more pathological vessels based on the lumina of the vessels included in the contrasted vessel images.

A pathological vessel in the context of the present application may be any vessel experiencing a pathological condition, such as a stenosis, a lesion, a vasoconstriction or a vasodilation.

Pathological vessel detection 670 may further determine, e.g., based on the determined lumen of the pathological vessel, the grade of a pathological condition, e.g., a stenosis in a pathological vessel, as e.g., defined by the Society of Cardiovascular Computed Tomography (SCCT). Accordingly, pathological vessel detection 670 may, based on a comparison of the total lumen with the unobstructed lumen, determine the grade of the stenosis. It will be understood that pathological vessel detection 670 may be able to also grade stenoses in vessels other than the coronary arteries based on the grading system applicable to such vessels.

In some cases, pathological vessel detection 670 may detect more than one pathological vessel. In such cases, pathological vessel detection 670 may further be able to determine in which order the pathological vessels may be treated during a medical intervention. Such a determination may for example be based on a starting position of a medical intervention and the position of the pathological vessel relative to the starting position or may be based on the grading of the severity of the pathological conditions of the pathological vessels discussed above.

It will be understood that pathological vessel detection 670 may also perform the detection based on vessel images 612 directly or may be integrated with any one of the other processing entities of roadmap generation phase 600 performing image segmentation, i.e., contrast detection 640, vessel segmentation 650 and contrast application object segmentation 660.

Imaging physiological information 611 may be processed by cardiac cycle detection 620. Cardiac cycle detection 620 may identify one or more cardiac cycles within imaging physiological information 611. Cardiac cycle detection 120 may identify at least one cardiac cycle within imaging physiological information 111 by detecting a first R peak and a second R peak within imaging physiological information 111. The first and the second R peak may indicate the start and the end, respectively, of a cardiac cycle. It should be understood that any other graphical deflection of an ECG may be used to indicate the start and the end of a cardiac cycle. Accordingly, cardiac cycle detection 620 may e.g., detect a first and a second P wave. Cardiac cycle detection 620 may detect cardiac cycles using any suitable analysis of an ECG. For example, cardiac cycle detection 620 may detect cardiac cycles based on performing different types of analyses-based transforms, such as short-time Fourier-transform or based on deriving event vectors from the ECG and providing decision rules, which determine cardiac cycles based on the derived event vectors.

The one or more cardiac cycles detected by cardiac cycle detection 620 may be included in, e.g., stored as part of, first alignment data 612. In addition, the one or more cardiac cycles detected by cardiac cycle detection 620 may be provided to EDR detection 630.

EDR detection 630 may derive, based on the one or more cardiac cycles, an electrocardiogram derived respiratory (EDR) signal. The EDR signal may be derived by observing fluctuations between detected different cardiac cycles. Generally speaking, inhaling typically increases and exhaling typically decreases the heart rate. More precisely, such fluctuations can in some embodiments be used to derive the EDR signal by computing for the one or more detected cardiac cycles, the R-to-S peak. The R-to-S peak corresponds to the amplitude of the EDR signal. The R-to-S-peaks are then interpolated using cubic splines to obtain the EDR signal. It should be understood that in some embodiments, other approaches may be used to obtain an EDR signal from the imaging physiological information 611. The EDR signal may be included in, e.g., stored as part of, second alignment data 713.

It should be noted that in some embodiments, EDR detection 730 may be omitted. In such embodiments, second alignment data 613 may only include contrast application object segmentation data. Further, in some embodiments EDR detection 630 may be included in cardiac cycle detection 620. For example, the approach used by cardiac cycle detection 620 to identify one or more cardiac cycles may also be able to directly provide an EDR signal or be able to provide an EDR signal based on an intermediate act of the approach.

Figure 8:
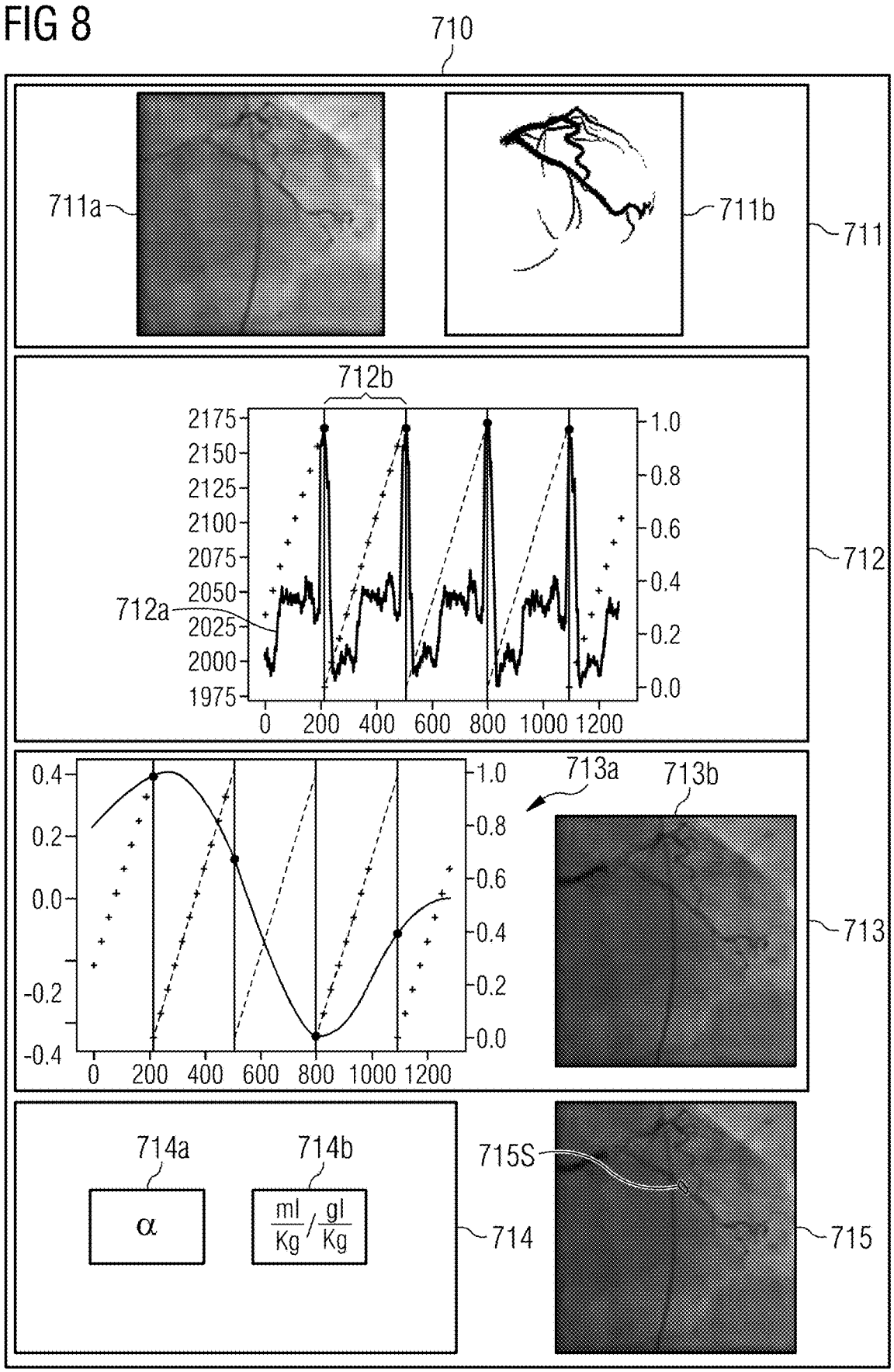
FIG. 8 shows an example of a vessel roadmap according to embodiments.

As mentioned above, the output of processing entities 620 to 670 forms part of vessel roadmaps 710, which are part of vessel roadmap library 700. To illustrate the data, which may be included in a vessel roadmap 710, FIG. 8 shows an example vessel roadmap 710, including a vessel roadmap image 711, first alignment data 712, second alignment data 713, imaging parameters 714 and pathological vessel information 715.

Vessel roadmap image 711 may include a vessel image 711a. Vessel roadmap image 711a corresponds to a vessel image 612 of the vessel image sequence 610, which has been identified by contrast detection 640 as including contrast. Further, vessel roadmap image 711 may include vessel segmentation data 711b generated by vessel segmentation 650. Both vessel roadmap 711a and vessel segmentation data 711b may be used as the roadmap to be laid over a fluoroscopy image during the roadmap deployment phase 800 by vessel overlay roadmap 881 discussed later. Accordingly, vessel roadmap image 711 is the part of vessel roadmap 711b providing the actual vessel roadmap. In some embodiments, vessel roadmap image 711 may correspond to a vessel image 612 recorded as part of the vessel image sequence 610 as well as an image indicating the vessel segmentation data generated by vessel segmentation 650. In some embodiments, vessel roadmap image 711 may only include an image indicating the vessel segmentation data generated by vessel segmentation 650, as illustrated by vessel segmentation data 711b in FIG. 8. In some embodiments, vessel roadmap image 711 may be data indicating the position of vessel pixels, which may subsequently be used to highlight corresponding pixels in a fluoroscopy image as vessel pixels.

First alignment data 712 may include imaging physiological information 611 as recorded as part of the vessel image sequence 610. Since imaging physiological information 611 may in some embodiments be an ECG, imaging physiological information 111 is shown in FIG. 8 as an alignment ECG 712a. Further, first alignment data 712 may include one or more cardiac cycles as detected by cardiac cycle detection 640. In FIG. 8, a cardiac cycle 712b is illustrated as indicted by adjacent R peaks in alignment ECG 712a. While first alignment data 712 of vessel roadmap 710 is shown here as based on an ECG curve, it should be understood that alignment ECG 712a and cardiac cycle 712b may typically be stored within second alignment data 712 as an indication of the ECG value, i.e., e.g., the amplitude of the complex lead discussed above, and the position of the ECG value within a cardiac cycle. Accordingly, the first alignment data may in some embodiments not include the entire alignment ECG 712a. Instead, first alignment data 712 may e.g., be a tuple with the first value indicating the amplitude and the second value indicating the position within a cardiac cycle. In some embodiments, if more than one cardiac cycle has been identified. First alignment data 712 may be a triple with the third value identifying the respective cardiac cycle. In some embodiments, in which cardiac cycle detection 640 is omitted, the cardiac cycle information may be replaced by temporal information indicating an associated point in time of the ECG value relative to other vessel roadmaps 710.

More generally, first alignment data 712 provide data to enable aligning vessel roadmap image 711 with a fluoroscopy image. Vessels shift for a variety of factors, including, but not limited to, cardiac muscle contraction and relaxation, i.e., cardiac motion, as well as breathing. First alignment data 712 enable compensation of vessel shift caused by cardiac motion. To this end, first alignment data 712 provide physiological information relating to the heart. It should therefore be understood that first alignment data 712 generally provide data enabling an alignment of a vessel roadmap with a fluoroscopy image necessitated due to vessel shifts caused by cardiac motion. First alignment data 712 may thus include any cardiac information necessary to compensate such vessel shifts.

Second alignment data 713 may include an EDR signal 713*a* generated by EDR detection 630, and contrast application object segmentation data 713*b* generated by contrast application object segmentation 160. EDR signal 713*a* is shown as a curve in FIG. 8 in order to illustrate EDR signal 713*a*. However, similarly to the discussion of alignment ECG 712*a*, EDR signal 713*a* may in some embodiments be a data set indicating the value of EDR signal 713*a* as well as the temporal position of the value within the EDR signal curve. Further, as shown in FIG. 8, contrast application object segmentation data 713*b* may in some embodiments be an image indicating the vessel segmentation data. In some embodiments, contrast application object segmentation data 713*b* may be data indicating the position of contrast application object pixels.

More generally, second alignment data 713 provide data to enable aligning vessel roadmap image 711 with a fluoroscopy image. While first alignment data 712 are described above as compensating vessel shift caused by cardiac motion, second alignment data 713 may compensate for vessel shift caused by breathing motion. To this end, second alignment data 713 provide both physiological information relating to the breathing and information relating to the position of the contrast application object, which may be shifted due to breathing. It should therefore be understood that second alignment data 713 generally provide data enabling an alignment of a vessel roadmap with a fluoroscopy image necessitated due to vessel shifts caused by breathing motion. Second alignment data 713 may thus include any breathing-related information necessary to compensate such vessel shifts. For example, in some embodiments, second alignment data 713 may include only one of EDR signal 713*a* and contrast application object segmentation data 713*b* since in some embodiments only one of the two may be sufficient to compensate vessel shifts cause by breathing motion. For example, in some embodiments EDR signal 213*a* may be omitted.

As discussed above, contrast application object segmentation data 713*b* is generated by contrast application object segmentation 660. Accordingly, second alignment data 713 is in some embodiments at least derived from vessel roadmap image 711. In embodiments, in which EDR signal 713*a* is also present, second alignment data 713 may further be derived from first alignment data 712 in addition to being derived from vessel image 711.

Imaging parameters 714 may include imaging parameters 613 associated with the imaging method used to obtain vessel image 612 included as the vessel roadmap image 611. As shown in FIG. 8, imaging parameters 714 may thus include angiography angle 214*a* and contrast medium dosage 714*b*.

Pathological vessel information 715 is generated by pathological vessel detection 670. Accordingly, pathological vessel information 715 indicates pathological vessels in vessel roadmap 712. As illustrated in FIG. 8, pathological vessel information 715 may e.g., correspond to vessel roadmap 712 with a highlighted region 715S indicating a pathological vessel. In addition to or instead of, pathological vessel information 715 may in some embodiments include data identifying pixels in vessel roadmap 712, which are part of a pathological vessel segment. Generally speaking, pathological vessel information 715 may be any kind of information indicating which of the vessel visible in vessel roadmap 712 is a pathological vessel.

Vessel roadmap library 700 is the output generated by roadmap generation phase 600. This output may subsequently be deployed during roadmap deployment phase 800. In some embodiments, roadmap deployment phase 800 may be a medical intervention, such as a percutaneous coronary intervention (PCI). PCI is performed using fluoroscopy. Accordingly, vessel roadmap library 700 can be laid over the real-time fluoroscopy images during the PCI in order to guide a medical specialist through the coronary arteries to, e.g., a stenosis without having to use a contrast medium. In such embodiments, roadmap generation phase 800 may include coronary angiography, which is used to obtain a coronary angiogram. The coronary angiogram in such embodiments corresponds to vessel image sequence 610. Since roadmap deployment phase 800 may be a medical intervention, it may also be referred to as an online phase, while roadmap generation phase 600 may also be referred to as an offline phase.

Roadmap deployment phase 800 performs real-time fluoroscopy 810 in order to obtain a real-time fluoroscopy image 811 and corresponding real-time first fluoroscopy information 812, real-time second fluoroscopy information 813 and imaging parameters 814.

Real-time fluoroscopy image 811 may be an image obtained using real-time fluoroscopy 810. Real-time fluoroscopy image 811 may be vessel image frame 201 discussed above with regard to method 100 of FIG. 1. During real-time fluoroscopy 810, no contrast medium needs to be injected into vessel or a vessel tree given that vessel images are provided by vessel roadmap library 700. Accordingly, since fluoroscopy is typically performed using X-ray, the only radio-opaque structure visible in the real-time fluoroscopy image 811, apart from e.g., bones of the patient, is a fluoroscopy object. Like vessel image 612, real-time fluoroscopy image 811 may be stored as a DICOM image.

First fluoroscopy information 812 may be any kind of fluoroscopy physiological information of a patient on whom real-time fluoroscopy 810 is performed and which may be used to overlay and align vessel roadmaps 711 with fluoroscopy image 811. In some embodiments, first fluoroscopy information 812 may include an ECG recorded while real-time fluoroscopy 810 is performed. In such embodiments, first fluoroscopy information 812 may be processed by cardiac cycle detection 820 to identify one or more cardiac cycles based on the ECG. The identified one or more cardiac cycles may then also be included in the real-time fluoroscopy information 812. Cardiac cycle detection 320 may detect one or more cardiac cycles in the fluoroscopy ECG in the same manner as cardiac cycle detection 640 may detect one or more cardiac cycles in the ECG recorded while vessel image sequence 610 is obtained.

The one or more cardiac cycles identified by cardiac cycle detection 820 may be processed by EDR detection 830. EDR detection 830 may derive an EDR signal based on the identified one or more cardiac cycles in the same manner as describe with respect to EDR detection 630. The derived EDR signal may then be included in second real-time fluoroscopy information 813.

As discussed above, in some embodiments EDR detection 630 may be omitted. In such embodiments, EDR detection 830 may additionally derive an EDR signal based on the one or more cardiac cycles included in first alignment data 712 of a vessel roadmap 710 selected by roadmap selection 870, which will be discussed in more detail below. It should be noted that EDR detection 830 may also be omitted if EDR detection 830 is omitted. In such embodiments, vessel roadmap selection 870 and vessel roadmap alignment 882 may operate without any EDR signals.

In addition to the EDR signal, second real-time fluoroscopy information 813 may include fluoroscopy object segmentation data identifying a position of a fluoroscopy object in fluoroscopy image 811. The fluoroscopy object may be a fluoroscopy catheter, which may e.g., be used during a medical intervention, such as PCI. As opposed to the contrast application object, which may also be a catheter, the fluoroscopy catheter may typically not be used to inject contrast medium into a vessel, though it may still be configured for that purpose. The fluoroscopy segmentation data may be generated by fluoroscopy segmentation 860 based on method 100 of FIG. 1.

Imaging parameters 814 may indicate one or more parameters associated with an imaging method used to obtain real-time fluoroscopy image 811. Accordingly, imaging parameters 814 may correspond to imaging parameters 613 and may thus include at least one of a fluoroscopy angle and a contrast medium dosage.

Figure 9:
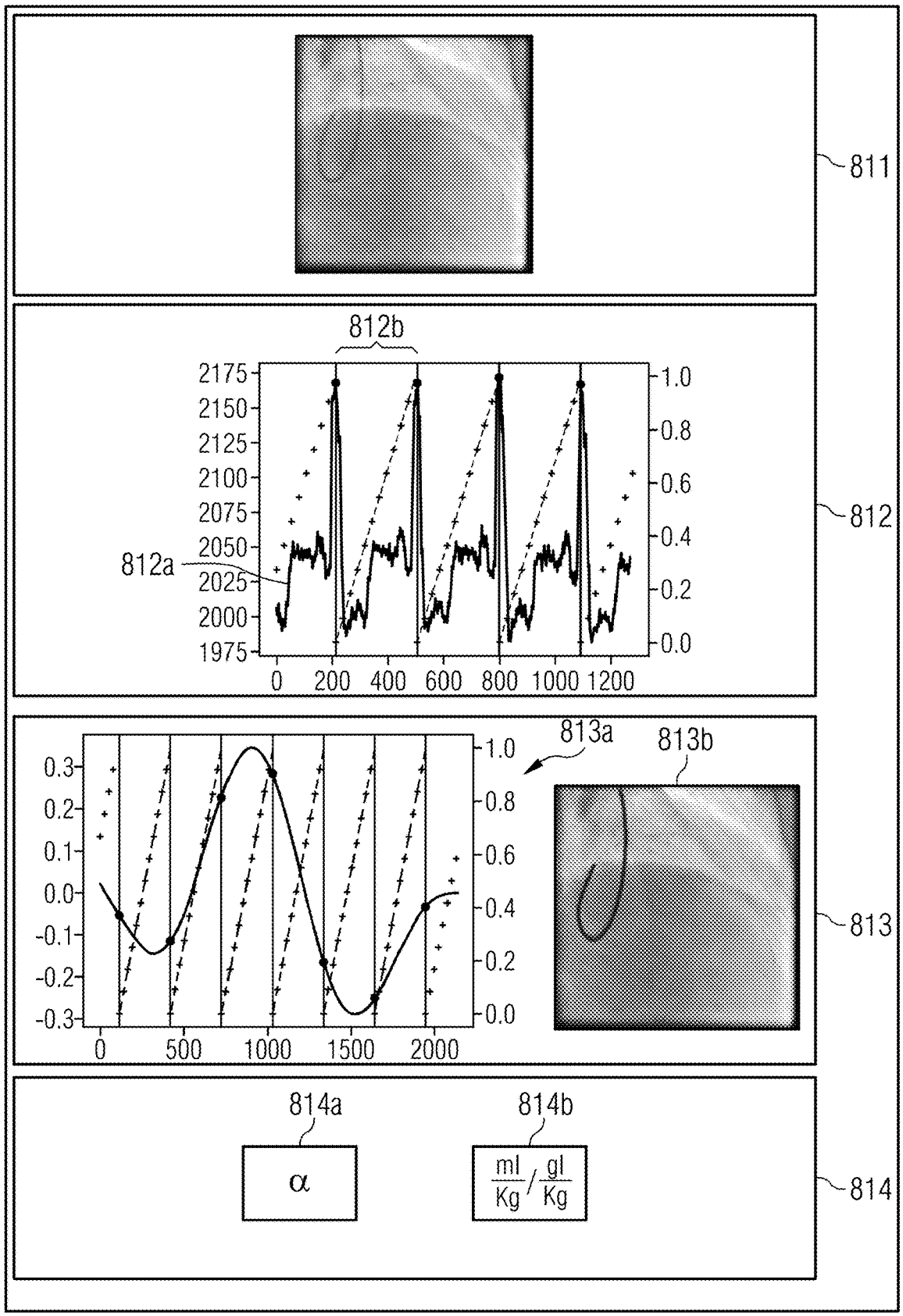
FIG. 9 shows an example of a real-time fluoroscopy image and information associated therewith according to embodiments.

The data recorded by real-time fluoroscopy 810 and processed by processing entities 820, 830 and 860 is illustrated in FIG. 9.

As shown in FIG. 9, real-time fluoroscopy image 811 includes the fluoroscopy image recorded by real time fluoroscopy 810. Typically, only the fluoroscopy object is visible in real-time fluoroscopy image 811, unless other radio-opaque structures of the patient are visible.

First fluoroscopy information 812 includes fluoroscopy ECG 812a recorded during real-time fluoroscopy and one or more cardiac cycles 812b identified by cardiac cycle detection 820. Analogously to first alignment data 712, first fluoroscopy information 812 may include any cardiac information necessary to compensate vessel shifts when laying one of the vessel roadmap images 711 over real-time fluoroscopy image 811. Accordingly, in some embodiments, first fluoroscopy information 812 may only include fluoroscopy ECG 812a or may include other or additional information to compensate vessel shifts when laying one of the vessel roadmap images 711 over real-time fluoroscopy image 811. Further, while fluoroscopy ECG 812a is illustrated as the ECG curve recorded during real-time fluoroscopy 810, in some embodiments only values corresponding to the point on the ECG curve may be included in first real-time fluoroscopy information 812, e.g., a tuple or a triple, respectively, including the amplitude value of the complex lead of the fluoroscopy ECG 812a, the temporal position within the ECG and an indication of the identified cardiac cycle.

Second real-time fluoroscopy information 813 may include a fluoroscopy EDR signal 813a generated by EDR detection 830 and contrast application object segmentation data 813b generated by contrast application object segmentation 860. EDR signal 813a is shown as a curve in FIG. 9 in order to illustrate fluoroscopy EDR signal 813a. However, similarly to the discussion of preceding discussions of curves, i.e., alignment ECG 712a, EDR signal 713a and fluoroscopy ECG 812a, fluoroscopy EDR signal 813a may in some embodiments be a data set indicating the value of fluoroscopy EDR signal 813a as well as the temporal position of the value within the fluoroscopy EDR signal curve. Further, as shown in FIG. 9, fluoroscopy object segmentation data 813b may in some embodiments be an image indicating the vessel segmentation data. In some embodiments, fluoroscopy object segmentation data 313b may be data indicating the position of fluoroscopy object pixels.

The data obtained by real-time fluoroscopy 810 and vessel roadmap library 700 may be provided to a vessel roadmap selection 870. Vessel roadmap selection 870 may select one of the vessel roadmaps 710 from roadmap library 700 based on comparing first real-time fluoroscopy information 812 with first alignment data 712 of each vessel roadmap 710 in roadmap library 700.

More precisely, vessel roadmap selection 870 may compare alignment ECG 712a of each vessel roadmap 710 with fluoroscopy ECG 812a to determine a vessel roadmap 710 approximately corresponding, in terms of the respective alignment ECG 712a, to fluoroscopy ECG 812a. By selecting a vessel roadmap based on an ECG comparison, a vessel roadmap 710 can be chosen in which the position of the vessels is most similar, due to a similar shift caused by similar cardiac motion, to the position of the vessels in real time fluoroscopy image 811.

In addition, in some embodiments vessel roadmap selection 870 may select a vessel roadmap 710 from roadmap library 700 based on comparing second real-time fluoroscopy information 813 with the second alignment data 713 of each vessel roadmap 710. More precisely, vessel roadmap selection 870 may additionally compare EDR signal 713a of each vessel roadmap 210 with fluoroscopy EDR signal 813a to determine a vessel roadmap 210 approximately corresponding, in terms of the respective EDR signal 213a, to fluoroscopy EDR signal 813a. By selecting a vessel roadmap additionally based on an EDR signal comparison, a vessel roadmap 710 can be chosen in which the position of the vessels is most similar, due to a similar shift caused by similar breathing motion, to the position of the vessels in real time fluoroscopy image 811.

In summary, vessel roadmap selection 870 may, based on an ECG comparison and in some embodiments based on an additional EDR comparison, select a vessel roadmap 710 from vessel roadmap library 700. The vessels visible in the accordingly selected vessel roadmap 710 have experienced a similar shift due to cardiac motion as well as due to breathing motion. The position of the vessels visible in the accordingly selected vessel roadmap 710 may thus be approximately similar to the position of the vessels in real-time fluoroscopy image 811.

Angle comparison 880 may compare the angiography angle included in the imaging parameters 714 of vessel roadmap 710 with the fluoroscopy angle included in imaging parameters 814 of real-time fluoroscopy 810. The comparison performed by angle comparison 880 may ensure that the view provided by selected vessel roadmap image 711 and the view provided by real-time fluoroscopy image 811 are obtained at approximately the same C-arm position. If the angiography angle and the fluoroscopy angle are approximately the same, the views provided by selected vessel roadmap image 711 and real-time fluoroscopy image 811 are approximately similar. If the angiography angle and the fluoroscopy angle differ, e.g., differ by more than an angle difference threshold, the views provided by selected vessel roadmap image 711 and real-time fluoroscopy image 811 may be too different. Accordingly, in such cases angle comparison 880 may decide to refrain from overlaying vessel roadmap image 711 over real-time fluoroscopy image

811. Due the deviation of the views in 3D corresponding to the difference of the angles, vessel roadmap overlay 881 and vessel roadmap alignment 882 may not be able properly overlay and align the views. The angle difference threshold may e.g., be 5° or 2°.

Angle comparison 880 may in some embodiments indicate, via a display, such as display 1260, to a medical specialist operating a medical imaging device, such as medical imaging device 1200, that the angiography angle and the fluoroscopy angle differ. Angle comparison 880 may further indicate how to correct the fluoroscopy angle by indicating the proper angular position to which C-arm 1230 of medical imaging device 1200 should be moved. In some embodiments, angle comparison 880 may also be configured to control C-arm 1230 and may thus be configured to move C-arm 1230 to the proper angular position.

Vessel roadmap overlay 881 may lay the selected vessel roadmap image 711 of the selected vessel roadmap 710 over the real-time fluoroscopy image 811. In some embodiments, vessel roadmap overlay 881 may perform the overlay by superimposing vessel image 711a over real-time fluoroscopy image 811. Superimposing vessel image 711a may in some embodiments be achieved by transparent color blending, i.e., two pixel values from vessel image 711a, one corresponding to the pixel value as recorded originally in corresponding vessel image 712 and one corresponding to a color selected for vessel representation, can be simultaneously shown. In some embodiments, vessel roadmap image 211a may be overlaid with a variable level of opacity. In some embodiments, vessel segmentation data 711b may be integrated into real-time fluoroscopy image 811, e.g., by changing the values of the pixels indicated as vessel pixels by vessel segmentation data 711b.

FIG. 10 provides an example of vessel roadmap overlay 881. On the left, real-time fluoroscopy image 811 with a visible fluoroscopy object can be seen prior to the overlay of a vessel roadmap image 711. On the right, real-time fluoroscopy image 811 can be seen after the overlay of a vessel roadmap image 711.

Roadmap image 711 laid over real-time fluoroscopy image 811 by vessel roadmap overlay 881 may be aligned by vessel roadmap alignment 882. Vessel roadmap alignment 882 aligns overlaid vessel roadmap image 711 and real-time fluoroscopy image 811 based on second alignment data 713 and real time second fluoroscopy information 813. In particular, vessel roadmap alignment 882 aligns the position of the contrast application object with the position of the fluoroscopy object based on contrast application object segmentation data 713b and fluoroscopy object segmentation data 813b. In other words, vessel roadmap alignment 882 aligns the positions of the contrast application object and the fluoroscopy object, which may both be catheters. For example, both object segmentation data 713b and fluoroscopy object segmentation data 813b may each indicate, in some embodiments, a centerline of the respective catheter. In such embodiments, vessel roadmap alignment 880 aligns vessel roadmap 811 with real-time fluoroscopy image 811 by minimizing the sum of squared distances between closest points on the centerlines of the catheters. It should be noted that aligning may include in-plane rotation, i.e., rotating the roadmap to achieve better alignment. By aligning the positions of the contrast application object with the position of the fluoroscopy object, any vessel shift caused by breathing motion may be further compensated in order to further improve the accuracy of overlaid vessel roadmap 710.

FIG. 11 provides an example of an alignment by vessel roadmap alignment 882 based on catheter centerlines. As can be seen on the left side of FIG. 11, prior to alignment by vessel roadmap alignment 882, the centerlines are apart from one another. After alignment by vessel roadmap alignment 882, the centerlines are approximately in the same position.

Finally, pathological vessel guidance 883 providing guidance for the fluoroscopy object to the pathological vessel detected by pathological vessel detection 170 based on the selected vessel roadmap 711 and second fluoroscopy information 813. To this end, pathological vessel guidance 883 may determine a path from the fluoroscopy object to the pathological vessel based on the second real-time fluoroscopy information 813, which includes the fluoroscopy segmentation data, and the vessel segmentation data 711b included in the selected vessel roadmap image 711. In other words, the path may indicate the vessel segments the fluoroscopy object needs to pass through in order to reach the pathological vessel from the current position of the fluoroscopy object within the vessels of a patient. Accordingly, pathological vessel guidance 883 may provide guidance for the fluoroscopy object by indicating the vessel segments through which the fluoroscopy object needs to pass in order to reach the pathological vessel.

Pathological vessel guidance 883 may in some embodiments. provide the guidance to a medical specialist operating the fluoroscopy object e.g., by displaying the path determined by pathological vessel guidance 883 on a display, such as display 860, to the medical specialist. In some embodiments, the fluoroscopy object may be a robot-controlled fluoroscopy object. In such embodiments, pathological vessel guidance 883 may provide the guidance to the robot-controlled fluoroscopy object to enable the robot-controlled fluoroscopy object to be guided to the pathological vessel.

In summary, vessel roadmap selection 870, vessel roadmap overlay 881 and vessel roadmap alignment 882 select, overlay and align one of the vessel roadmaps 710 with fluoroscopy image 811 in order to provide a vessel roadmap during roadmap deployment phase 800. By taking into account first alignment data 712, second alignment data 713, the first fluoroscopy information 712 and the second fluoroscopy information 813, a vessel roadmap can be selected, overlaid and aligned with fluoroscopy image 811, which corresponds to the actual position of the vessels in fluoroscopy image 811 without having to inject contrast medium. Thus, vessel roadmap selection 870, vessel roadmap overlay 881 and vessel roadmap alignment 882 compensate any motion of the vessels, such as cardiac motion or breathing motion, in order to correctly overlay one of the vessel roadmaps 710 over fluoroscopy image 811. Further, the duration of the fluoroscopy may be reduced based on generated vessel roadmap library 700, thereby reducing radiation exposure due to the guidance provided by pathological vessel guidance 883, which provides direct guidance from the position of the fluoroscopy objection to the pathological vessel. This guidance reduces the durations of medical interventions, such as PCI, since guidance based on the properly selected, overlaid and aligned roadmap may enable fast and reliable navigation with the fluoroscopy object through the vessels.

As briefly discussed above, FIGS. 12A and 12B show an exemplary medical imaging system 1200, which may e.g., be used to obtain sequence 200 of vessel image frames 201. Medical imaging system 1200 may be used for both angiography and fluoroscopy. However, angiography and fluoroscopy may also be performed on separate systems with largely identical elements. In FIG. 12A, medical imaging system 1200 is in neutral position $P_0$. In FIG. 12B, medical imaging system 1200 is in a rotated position $P_1$. As discussed above, the angle between the two positions is referred to as the angiography angle or the fluoroscopy angle, depending on the imaging process currently performed by medical imaging system 1200. Medical imaging system 1200 includes C-arm 1230, on which X-ray emitter 1231 and X-ray detector 1232 may be mounted. C-arm 1230 and thereby X-ray emitter 1231 and X-ray detector 1232 are positioned to center around patient surface 1240. X-ray emitter 1231 may emit X-rays which may penetrate through a patient positioned on patient surface 1240. X-ray detector 1232 detects the X-rays emitted from X-ray emitter 1231. When a patient on patient surface 1240 is injected with a radio-opaque contrast agent into the patient's vessels, some of the X-rays emitted by X-ray emitter 1231 are absorbed by the radio-opaque contrast agent, leading X-ray detector 1232 to detect an image of the vessels filled with the radio-opaque contrast agent, i.e., an angiogram. X-ray emitter 1231 and X-ray detector 1232 may also collectively be referred to as x-ray imaging means.

C-arm 1230 may be coupled to C-arm rotation unit (motor) 1220. C-arm rotation unit 1220 may be any motor configured to rotate C-arm 1230 according to an angiography angle or a fluoroscopy angle as either instructed by the medical specialist or angle comparison 880. C-arm rotation unit 1220 may be attached to and controlled by C-arm control until (controller) 1210. C-arm control unit 1210 may be any kind of circuitry capable of controlling C-arm 1230. For example, C-arm control unit 1210 may include computing device 1300 of FIG. 13 or may be configured to interface with computing device 1300.

Medical imaging system 1200 may further include a control panel 1250 mounted onto a side surface of patient surface support 1241. Control panel 1250 may be used to control C-arm 1230 in embodiments of the present invention in which method 400 displays real-time fluoroscopy image 1211 with an overlaid vessel roadmap image 211 including the path to the one or more pathological vessels to the medical specialist in order to guide the medical specialist to the one or more pathological vessels. FIG. 12 does not show any connections between control panel 1250 and C-arm 1230 to simplify the depiction of exemplary medical imaging system 1200. In some embodiments, the connection may be wireless. In some embodiments, the connection may be wired and may e.g., be integrated into the ceiling of the room where medical imaging system 1200 is located.

Medical imaging system 1200 may finally also include a display 1260. Display 1260 may be used to display information to the medical specialist, such as real-time fluoroscopy image 811 with an overlaid vessel roadmap image 711 including the path to the one or more pathological vessels. Further, display 1260 may be used to display the vessel segmentation data included in overlaid vessel roadmap image 711, including labels for the various vessel segments visible on display 1260. In some embodiments, display 1260 may be a touch screen, which may be used to toggle the display of the vessel segmentation data on and off. In some embodiments, display 1260 may further display a confidence level indicating the confidence of roadmap selection 870, vessel comparison 881 and vessel roadmap alignment 882 in the accuracy of the overly and the alignment. In some embodiments, display 860 may also display, to the medical specialist, the appropriate angular position of C-arm 830 during fluoroscopy to enable proper overlay and alignment of vessel roadmap image 711 as determined by angle comparison 880.

FIG. 13 shows a computing device 1300 configured to perform method 100 and/or the workflow of FIGS. 6A and 6B. Computing device 1300 may include a processor 1310, a graphics processing unit (GPU) 1320, a memory 1330, a bus 1340, a storage 1350, a removable storage 1360, an medical imaging system control interface 1370 and a communications interface 1380.

Processor 1310 may be any kind of single-core or multi-core processing unit employing a reduced instruction set (RISC) or a complex instruction set (CISC). Exemplary RISC processing units include ARM based cores or RISC V based cores. Exemplary CISC processing units include x86 based cores or x86-64 based cores. Processor 1310 may further be an application specific integrated circuit (ASIC) or a field-programmable gate-array specially tailored to or programmed, respectively, to perform method 100 and/or the workflow of FIGS. 6A and 6B. Processor 1310 may perform instructions causing computing device 1300 to perform method 100 and/or the workflow of FIGS. 6A and 6B. Processor 1310 may be directly coupled to any of the components of computing device 1300 or may be directly coupled to memory 1330, GPU 1320 and bus 1340.

GPU 1320 may be any kind of processing unit optimized for processing graphics related instructions or more generally for parallel processing of instructions. As such, GPU 1320 may perform part or all of method 100 and/or the workflow of FIGS. 6A and 6B to enable fast parallel processing of instructions relating to method 100 and/or the workflow of FIGS. 6A and 6B. It should be noted that in some embodiments, processor 1310 may determine that GPU 1320 need not perform instructions relating to method 1300. GPU 1320 may be directly coupled to any of the components of computing device 1300 or may be directly coupled to processor 1310 and memory 1330. GPU 1320 may also be coupled to a display, such as display 1260 of medical imaging system 1200, via connection 1320C. In some embodiments, GPU 1320 may also be coupled to bus 1340.

Memory 1330 may be any kind of fast storage enabling processor 1310 and GPU 1320 to store instructions for fast retrieval during processing of the instructions well as to cache and buffer data. Memory 1330 may be a unified memory coupled to both processor 1310 and GPU 1320 enabling allocation of memory 1330 to processor 1310 and GPU 1320 as needed. Alternatively, processor 1310 and GPU 1320 may be coupled to separate processor memory 1330*a* and GPU memory 1330*b*.

Storage 1350 may be a storage device enabling storage of program instructions and other data. For example, storage 1350 may be a hard disk drive (HDD), a solid state disk (SSD) or some other type of non-volatile memory. Storage 1350 may for example store the instructions of method 100 and/or the workflow of FIGS. 6A and 6B as well as the e.g., the sequence 200 of vessel image frames 201, vessel image sequence 110 and vessel roadmap library 200.

Removable storage 1360 may be a storage device which can be removably coupled with computing device 1300. Examples include a digital versatile disc (DVD), a compact disc (CD), a Universal Serial Bus (USB) storage device, such as an external SSD, or a magnetic tape. Removable storage 1340 may for example be used to provide the sequence 200 to computing device 1300 and thereby to method 100 or to store the valid positions of tip 210T. It should be noted that removable storage 960 may also store other data, such as instructions of method 100, or may be omitted.

Storage 1350 and removable storage 1360 may be coupled to processor 1310 via bus 1340. Bus 1340 may be any kind of bus system enabling processor 1310 and optionally GPU 1320 to communicate with storage device 1350 and removable storage 960. Bus 1340 may for example be a Peripheral Component Interconnect express (PCIe) bus or a Serial AT Attachment (SATA) bus.

Medical imaging system control interface 1370 may enable computing device 1300 to interface with medical imaging system 1200 via connection 1370C to control C-arm 1230 in accordance with the workflow of FIGS. 6A and 6B. For example, medical imaging system control interface 1370 may be dedicated logic circuitry configured to control rotation of C-arm 1230. In some embodiments, medical imaging system control interface 1370 may be C-arm control unit 1310. In some embodiments, medical imaging system control interface 1370 may also be omitted and computing device 1300 interfaces with medical imaging system 1200 solely via communications interface 1380. In such embodiments, processor 1310 may control C-arm directly via communications interface 1370. Medical imaging system control interface 1370 may further be coupled to a robot-controlled fluoroscopy object, e.g., a catheter, in order to guide the robot-controlled fluoroscopy object to the one or more pathological vessels.

Communications interface 1380 may enable computing device 1300 to interface with external devices, either directly or via network, via connection 1380C. Communications interface 1380 may for example enable computing device 1300 to couple to a wired or wireless network, such as Ethernet, Wifi, a Controller Area Network (CAN) bus or any bus system appropriate in medical systems. For example, computing device 1300 may be coupled with medical imaging system 1200 via connection 1380C in order to receive sequence 200 of vessel image frames 201, vessel image sequence 610 or real-time fluoroscopy image 811 or to provide, overlay and align a selected vessel roadmap image 711. Communications interface may also be a USB port or a serial port to enable direct communication with an external device.

As stated above, computing device 1300 may be integrated with medical imaging system 1200. For example, computing device 1300 may be integrated with C-arm control unit 1230 or may be placed inside patient surface support 1240.

The embodiments may further be illustrated by the following examples.

In an example, a computer-implemented method for detecting a tip of a vascular catheter in a sequence of vessel image frames obtained using x-rays, includes the acts of determining, within the vessel image frames, a proximal point, the proximal point corresponding to a vessel ostium, cropping the sequence of vessel image frames to an image area surrounding the proximal point to generate a cropped sequence of cropped vessel image frames, detecting, within cropped vessel image frames not indicative of a contrast medium, the tip of the vascular catheter, and tracking, within the sequence of vessel image frames, the detected tip of the vascular catheter.

In an example, the determining the proximal point may include detecting the proximal point within vessel image frames indicative of the contrast medium.

In an example, the detecting the proximal point may include detecting the contrast medium within the vessel image frames to identify the vessel image frames indicative of the contrast medium.

In an example, the detecting the proximal point may include detecting a pattern of the contrast medium exiting the tip of the vascular catheter.

In an example, the detecting the proximal point may be performed using K-means clustering.

In an example, the determining the proximal point may include receiving information identifying the proximal point.

In an example, the detecting the tip of the vascular catheter within the cropped vessel image frames not indicative of the contrast medium may be based on classifying, a position within each cropped vessel image frame as the tip.

In an example, the detecting the tip of the vascular catheter may output a detected position of the tip of the vascular catheter per cropped vessel image frame not indicative of a contrast medium and the detecting the tip of the vascular catheter may include Kalman filtering the detected positions to generate a filtered detected position.

In an example, the tracking the detected tip of the vascular catheter is based on a correlation between temporally adjacent vessel image frames.

In an example, the tracking of the detected catheter tip may output a tracked position of the tip of the vascular catheter per vessel image frame and the tracking the detected tip of the vascular catheter may include Kalman filtering the tracked positions to generate a filtered tracked position.

In an example, the detecting the tip of the vascular catheter and the tracking the detected tip of the vascular catheter within the sequence of vessel image frames are performed concurrently.

In an example, the method may further include comparing a detected position of the tip of the vascular catheter, the detected position being output by the detecting the tip of the vascular catheter, with a tracked position of the tip of the vascular catheter, the tracked position being output by the tracking of the detected tip of the vascular catheter, if the detected position and the tracked position differ by less than a position difference threshold, treating the detected position as a valid position of the tip of the vascular catheter, and, if the detected position and the tracked position differ by more than the position difference threshold, treating the tracked position as the valid position of the tip of the vascular catheter.

In an example, wherein the comparing the detected position of the tip with the tracked position of the tip may further include, if the detected position and the tracked position differ by more than the position difference threshold, resetting the detecting of the of the tip of the vascular catheter based on the tracked position.

In an example, a non-transitory computer-readable medium may include instructions configured to be executed by a computer including at least one processor, the instructions causing the processor to perform the method according to any one of the preceding examples.

In an example, a medical imaging device including x-ray imaging means configured to record a sequence of vessel image frames and at least one processor, the processor being configured to perform the method according to any one of the preceding examples.

The preceding description has been provided to illustrate the detection of a tip of a catheter in a sequence of vessel image frames, e.g., for the purpose of generating and deploying a vessel roadmap. It should be understood that the preceding description is in no way meant to limit the scope of the invention to the precise embodiments discussed throughout the description. Rather, the person skilled in the art will be aware that these embodiments may be combined, modified or condensed without departing from the scope of the invention as defined by the following claims.

The invention claimed is:

1. A computer-implemented method for detecting a tip of a vascular catheter in a sequence of vessel image frames obtained using x-rays, the method comprising:
   acquiring the sequence of vessel image frames;
   determining, within the vessel image frames, a proximal point, the proximal point corresponding to a vessel ostium;
   cropping the sequence of vessel image frames to an image area surrounding the proximal point, resulting in a cropped sequence of cropped vessel image frames;
   detecting in real time with the acquisition, within cropped vessel image frames not indicative of a contrast medium, the tip of the vascular catheter;
   tracking substantially concurrently with the detecting, within the sequence of vessel image frames, the detected tip of the vascular catheter; and
   comparing a detected position of the tip of the vascular catheter, the detected position being output by the detecting of the tip of the vascular catheter with a tracked position of the tip of the vascular catheter, the tracked position being output by the tracking of the detected tip of the vascular catheter;
   when the detected position and the tracked position differ by less than a position difference threshold, treating the detected position as a valid position of the tip of the vascular catheter; and
   when the detected position and the tracked position differ by more than the position difference threshold, treating the tracked position as the valid position of the tip of the vascular catheter.

2. The method of claim 1, wherein the determining the proximal point includes detecting the proximal point within vessel image frames indicative of the contrast medium.

3. The method of claim 2, wherein the detecting the proximal point includes detecting the contrast medium within the vessel image frames and identifying the vessel image frames indicative of the contrast medium based on the detecting.

4. The method of claim 2, wherein detecting the proximal point includes detecting a pattern of the contrast medium exiting the tip of the vascular catheter.

5. The method of claim 2, wherein detecting the proximal point is performed using K-means clustering.

6. The method of claim 1, wherein the determining the proximal point includes receiving information identifying the proximal point.

7. The method of claim 1, wherein detecting the tip of the vascular catheter within the cropped vessel image frames not indicative of the contrast medium is based on classifying a position within each cropped vessel image frame as the tip.

8. The method of claim 1, wherein:
   detecting the tip of the vascular catheter outputs a detected position of the tip of the vascular catheter per cropped vessel image frame not indicative of a contrast medium; and
   detecting the tip of the vascular catheter further includes Kalman filtering the detected positions.

9. The method of claim 1, wherein tracking the detected tip of the vascular catheter is based on a correlation between temporally adjacent vessel image frames.

10. The method of claim 1, wherein:
    tracking of the detected catheter tip outputs a tracked position of the tip of the vascular catheter per vessel image frame; and
    tracking of the detected catheter tip of the vascular catheter further includes Kalman filtering the tracked positions.

11. The method of claim 1, wherein comparing the detected position of the tip with the tracked position of the tip further comprises:
    when the detected position and the tracked position differ by more than the position difference threshold, resetting the detecting of the of the tip of the vascular catheter based on the tracked position.

12. In a non-transitory computer-readable medium comprising instructions configured to be executed by a computer including at least one processor, the instructions causing the processor to:
    acquire a sequence of vessel image frames;
    determine, within the sequence of vessel image frames, a proximal point, the proximal point corresponding to a vessel ostium;
    crop each of the vessel image frames of the sequence of vessel image frames to an image area surrounding the proximal point, resulting in a cropped sequence of cropped vessel image frames;
    detect, in real time with the acquisition of the sequence of vessel image frames, within each cropped vessel image frames not indicative of a contrast medium, the tip of the vascular catheter;
    track, substantially concurrently with the detecting, within the sequence of vessel image frames, the detected tip of the vascular catheter;
    compare a detected position of the tip of the vascular catheter, the detected position being output by the detecting of the tip of the vascular catheter with a tracked position of the tip of the vascular catheter, the tracked position being output by the tracking of the detected tip of the vascular catheter;
    when the detected position and the tracked position differ by less than a position difference threshold, treating the detected position as a valid position of the tip of the vascular catheter; and
    when the detected position and the tracked position differ by more than the position difference threshold, treating the tracked position as the valid position of the tip of the vascular catheter.

13. The non-transitory computer-readable medium of claim 12, wherein the instructions cause the processor to determine the proximal point with detection of the proximal point within vessel image frames indicative of the contrast medium.

14. The non-transitory computer-readable medium of claim 12, wherein the instructions cause the processor to determine the proximal point by reception of information identifying the proximal point.

15. The non-transitory computer-readable medium of claim 12, wherein the instructions cause the processor to:
    output a tracked position of the tip of the vascular catheter per vessel image frame;
    and tracking Kalman filter the tracked positions.

16. A medical imaging device comprising:
    an x-ray imager configured to record a sequence of vessel image frames; and
    at least one processor configured to:
    determine, in real time as x-ray imager records the sequence of vessel image frames, within each of vessel image frames of the sequence of the vessel image frames, a proximal point, the proximal point corresponding to a vessel ostium;

crop the sequence of vessel image frames to an image area surrounding the proximal point, resulting in a cropped sequence of cropped vessel image frames;

detect, within cropped vessel image frames not indicative of a contrast medium, the tip of the vascular catheter;

track, within the sequence of vessel image frames, the detected tip of the vascular catheter;

compare a detected position of the tip of the vascular catheter, the detected position being output by the detecting of the tip of the vascular catheter with a tracked position of the tip of the vascular catheter, the tracked position being output by the tracking of the detected tip of the vascular catheter;

when the detected position and the tracked position differ by less than a position difference threshold, treating the detected position as a valid position of the tip of the vascular catheter; and when the detected position and the tracked position differ by more than the position difference threshold, treating the tracked position as the valid position of the tip of the vascular catheter.

\* \* \* \* \*